United States Patent
Mukawa

(10) Patent No.: US 9,658,456 B2
(45) Date of Patent: May 23, 2017

(54) IMAGE DISPLAY APPARATUS, IMAGE GENERATING DEVICE, AND TRANSMISSIVE SPATIAL LIGHT MODULATING DEVICE

(71) Applicant: Sony Corporation, Tokyo (JP)

(72) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 14/758,818

(22) PCT Filed: Nov. 5, 2013

(86) PCT No.: PCT/JP2013/079892
§ 371 (c)(1),
(2) Date: Jul. 1, 2015

(87) PCT Pub. No.: WO2014/109115
PCT Pub. Date: Jul. 17, 2014

(65) Prior Publication Data
US 2015/0338660 A1    Nov. 26, 2015

(30) Foreign Application Priority Data

Jan. 10, 2013  (JP) ................................. 2013-002248

(51) Int. Cl.
*G03H 1/00*     (2006.01)
*G02B 5/32*     (2006.01)
(Continued)

(52) U.S. Cl.
CPC ....... *G02B 27/0172* (2013.01); *G02B 3/0056* (2013.01); *G02B 5/0278* (2013.01);
(Continued)

(58) Field of Classification Search
CPC ........ G02B 27/0172; G02B 2027/0174; G02B 27/0103; G02B 27/017; G02B 27/0944;
(Continued)

(56) References Cited

U.S. PATENT DOCUMENTS

| 5,499,138 A | 3/1996 | Iba |
| 5,654,810 A | 8/1997 | Okamura et al. |

(Continued)

FOREIGN PATENT DOCUMENTS

| JP | 10-170859 A | 6/1998 |
| JP | 2006-162767 A | 6/2006 |

(Continued)

*Primary Examiner* — Jade R Chwasz
(74) *Attorney, Agent, or Firm* — Wolf, Greenfield & Sacks, P.C.

(57) ABSTRACT

An image display apparatus 100 includes: (A) an image generating device 111 including a light source 160 and a transmissive spatial light modulating device 150 formed with pixels 152 arranged in a two-dimensional matrix; and (B) a light guiding unit 120 that guides light from the image generating device 111, and emits the light toward an eye 21 of a viewer 20, wherein the transmissive spatial light modulating device 150 includes, on a light emitting side thereof, a microlens array 170 including a microlens corresponding to each pixel, and when an incident solid angle of light entering a pixel from the light source 160 is assumed to be $\omega_{in}$, and an emitting solid angle of light that passes through the pixel and is emitted from the microlens corresponding to the pixel is assumed to be $\omega_{out}$, $\omega_{out} > \omega_{in}$ is satisfied.

9 Claims, 23 Drawing Sheets

(51) Int. Cl.
*G03H 1/12* (2006.01)
*G02B 27/01* (2006.01)
*G02B 5/18* (2006.01)
*G02B 3/00* (2006.01)
*G02B 5/02* (2006.01)
*F21V 8/00* (2006.01)
*G02B 5/30* (2006.01)

(52) U.S. Cl.
CPC ............. *G02B 5/1842* (2013.01); *G02B 5/30* (2013.01); *G02B 5/32* (2013.01); *G02B 6/0035* (2013.01); *G02B 6/0096* (2013.01); *G02B 27/017* (2013.01); *G02B 2027/0123* (2013.01); *G02B 2027/0174* (2013.01); *G02B 2027/0178* (2013.01)

(58) Field of Classification Search
CPC .. G02B 5/0252; G02B 27/0101; G02B 27/22; G02B 5/0278; G02B 2027/0154; G02B 2027/0181; G02B 2027/0183; G03H 1/0005; G03H 1/02; G03H 1/04; G03H 1/08; G03H 2001/0027; G03H 2001/0033; G03H 1/2645; G03H 1/265; G03H 2001/0489; G03H 2001/2655; G03H 2001/266; G03H 2001/2665; G03H 2001/267; G03H 2001/2675; G03H 2210/10; G03H 2210/20; G03H 2210/30; G03H 2225/33; G03H 2225/34; G03H 1/10; G03H 1/12; G03H 1/14; G03H 2001/0077; G03H 2001/0439
USPC ........................................ 359/10, 11, 13, 15
See application file for complete search history.

(56) References Cited

U.S. PATENT DOCUMENTS

| | | | |
|---|---|---|---|
| 8,411,134 B2 | 4/2013 | Tomita | |
| 8,570,242 B2 | 10/2013 | Chosokabe et al. | |
| 8,797,433 B2 | 8/2014 | Kaizu et al. | |
| 8,861,090 B2 | 10/2014 | Mukawa | |
| 8,976,453 B2 | 3/2015 | Akutsu et al. | |
| 8,988,315 B2 | 3/2015 | Mukawa et al. | |
| 9,016,864 B2 | 4/2015 | Sasazaki et al. | |
| 9,164,221 B2 | 10/2015 | Akutsu et al. | |
| 9,311,752 B2 | 4/2016 | Chosokabe et al. | |
| 9,451,244 B2 | 9/2016 | Sasazaki et al. | |
| 9,488,846 B2 | 11/2016 | Hayashi | |
| 2009/0141501 A1* | 6/2009 | Mukawa ............... G02B 3/0056 362/296.1 |
| 2009/0201225 A1 | 8/2009 | Okada et al. | |
| 2010/0027289 A1 | 2/2010 | Aiki et al. | |
| 2010/0128107 A1 | 5/2010 | Tomita | |
| 2011/0241975 A1 | 10/2011 | Mukawa et al. | |
| 2011/0248905 A1 | 10/2011 | Chosokabe et al. | |
| 2012/0044571 A1 | 2/2012 | Mukawa | |
| 2012/0086623 A1 | 4/2012 | Takagi et al. | |
| 2012/0127434 A1 | 5/2012 | Sasazaki et al. | |
| 2012/0200810 A1 | 8/2012 | Horikawa | |
| 2012/0218426 A1 | 8/2012 | Kaizu et al. | |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0300766 A1 | 11/2013 | Mukawa | |
| 2014/0022284 A1 | 1/2014 | Chosokabe et al. | |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2015/0062699 A1 | 3/2015 | Hayashi | |
| 2015/0109679 A1 | 4/2015 | Mukawa et al. | |
| 2015/0138647 A1 | 5/2015 | Akutsu et al. | |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260995 A1 | 9/2015 | Mukawa | |
| 2015/0277125 A1 | 10/2015 | Hirano et al. | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |
| 2016/0154243 A1 | 6/2016 | Aiki | |

FOREIGN PATENT DOCUMENTS

| | | |
|---|---|---|
| JP | 2007-012530 A | 1/2007 |
| JP | 2007-094175 A | 4/2007 |
| JP | 2011-100090 A | 5/2011 |
| JP | 2012-083458 A | 4/2012 |

* cited by examiner

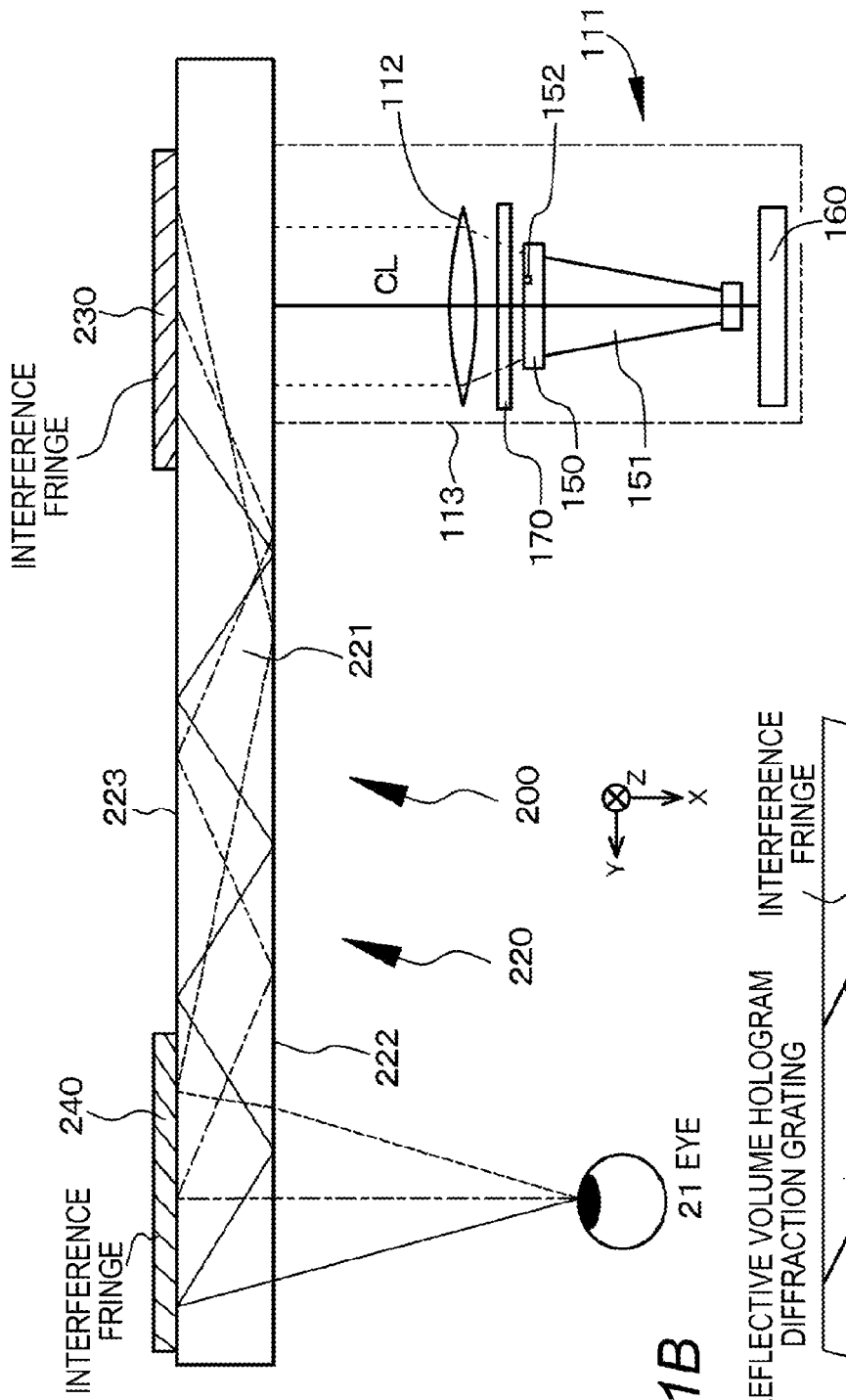
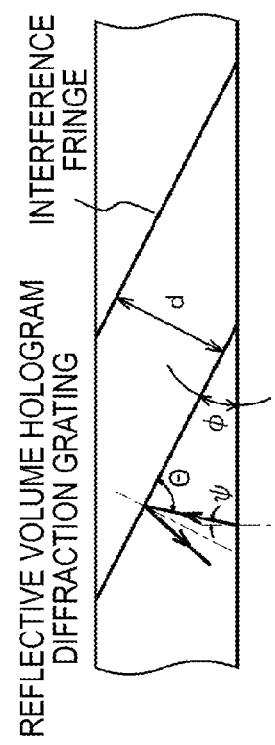

IMAGE DISPLAY APPARATUS, IMAGE GENERATING DEVICE, AND TRANSMISSIVE SPATIAL LIGHT MODULATING DEVICE

TECHNICAL FIELD

The present disclosure relates to a transmissive spatial light modulating device, an image generating device including the transmissive spatial light modulating device, and an image display apparatus including the image generating device, and more particularly, relates to an image display apparatus suitable for use in a head mounted display (HMD), and an image generating device suitable for use in the image display apparatus, and further a transmissive spatial light modulating device suitable for use in the image generating device.

BACKGROUND ART

A virtual image display apparatus (an image display apparatus) for presenting a two-dimensional image formed by an image generating device as an enlarged virtual image to a viewer through a virtual image optical system is known from JP 2006-162767 A, for example.

As shown in a conceptual diagram in FIG. 21, this image display apparatus 1100 includes: an image generating device 111 having a plurality of pixels arranged in a two-dimensional matrix; a collimator optical system 112 that converts light emitted from the pixels of the image generating device 111 into a parallel light beam; and a light guiding unit 120 that guides and emits the incident light converted into the parallel light beam by the collimator optical system 112. The light emitted from the light guiding unit 120 is guided to an eye 21 of a viewer 20. The light guiding unit 120 includes: a light guide panel 121 that propagates incident light therein by total reflection, and then emits the light; a first deflecting unit 130 (formed with a single light reflecting film, for example) that reflects the light that has entered the light guide panel 121 so that the light that has entered the light guide panel 121 is totally reflected inside the light guide panel 121; and a second deflecting unit 140 (formed with a multi-layer light reflecting film having a multi-layer stack structure, for example) that emits the light propagated inside the light guide panel 121 by total reflection from the light guide panel 121. Then, when such an image display apparatus 1100 constitutes, for example, an HMD, a reduction in the weight and the size of the device can be realized.

Alternatively, a virtual image display apparatus (an image display apparatus) that uses a hologram diffraction grating to present a two-dimensional image formed by an image generating device as an enlarged virtual image to a viewer through a virtual image optical system is also known from JP 2007-094175 A, for example.

As shown in a conceptual diagram in FIG. 22, this image display apparatus 1200 basically includes an image generating device 111 that displays an image, a collimator optical system 112, and a light guiding unit 220 that receives light from the image generating device 111 and guides the light to an eye 21 of a viewer. Here, the light guiding unit 220 includes a light guide panel 221, and a first diffraction grating member 230 and a second diffraction grating member 240 that are formed with a reflective volume hologram diffraction grating provided on the light guide panel 221. Then, a parallel light beam emitted from the collimator optical system 112 enters a first surface 222 of the light guide panel 221, and is emitted from the first surface 222.

The first diffraction grating member 230 and the second diffraction grating member 240 are attached to a second surface 223 of the light guide panel 221 that is parallel to the first surface 222 of the light guide panel 221.

CITATION LIST

Patent Documents

Patent Document 1: JP 2006-162767 A
Patent Document 2: JP 2007-094175 A
Patent Document 3: JP 10-170859 A

SUMMARY OF THE INVENTION

Problems to be Solved by the Invention

In an X-Y plane shown in FIG. 22, for example, light emitted from the image generating device 111 is converted into a group of parallel light beams having angles of view (or emission angles of light emitted from the respective pixels of the image generating device 111) different from one another by the collimator optical system 112. This group of parallel light beams is converted into a group of light beams having angles of view different from one another in an X-Z plane perpendicular to the group of parallel light beams, and enters the light guide panel 221. It is to be noted that in FIG. 22, typical parallel light beams in the X-Y plane are shown as parallel light beams $r_1$ (indicated by a solid line), $r_2$ (indicated by a dot-and-dash line), and $r_3$ (indicated by a dashed line), and in FIG. 23A, typical parallel light beams in the X-Z plane are shown as parallel light beams $R_1$ (indicated by a solid line), $R_2$ (indicated by a dot-and-dash line), and $R_3$ (indicated by a dashed line). In the image display apparatus 1200 shown in the figures, the lateral (horizontal) direction is assumed to be a Y-direction, and the longitudinal (vertical) direction is assumed to be a Z-direction. That is, light that displays a video image, various kinds of information, or the like is guided from the transverse direction with respect to the eye 21 of a viewer, and then enters the eye 21.

Now, in such a configuration, the problems described below arise due to the differences between the behavior of parallel light beams in the X-Y plane of light to be guided inside the light guide panel 221 and the behavior of parallel light beams in the X-Z plane. It is to be noted that FIG. 24A is a diagram for explaining the problems in an image display apparatus of the related art, and FIG. 24B is a diagram schematically showing a propagation state of light that is emitted from a center portion and an upper end of the collimator optical system, and that is guided by the light guide panel. Here, FIG. 24A is a diagram schematically showing a propagation state of light that is emitted from the image generating device, is guided by the light guiding unit, and reaches an eye in planes corresponding to the X-Z plane and the X-Y plane.

That is, in the above described configuration, light that has entered the light guide panel 221 from the first surface 222 enters the first diffraction grating member 230 placed on the second surface 223. It is to be noted that a distance from the center of the collimator optical system 112 to the center of the first diffraction grating member 230 is assumed to be $L_1$, a distance from the center of the first diffraction grating member 230 to the center of the second diffraction grating member 240 is assumed to be $L_2$, and a distance from the center of the second diffraction grating member 240 to the eye 21 is assumed to be $L_3$.

As for an X-direction component in the X-Y plane, each light beam $r_1$, $r_2$, $r_3$ is diffracted and reflected by the first diffraction grating member 230, is guided while being repeatedly subjected to total reflection between the first surface 222 and the second surface 223 as a parallel light beam inside the light guide panel 221, and travels in the Y-direction toward the second diffraction grating member 240 provided at the other end of the light guide panel 221. Then, the parallel light beam at each angle of view that has entered the second diffraction grating member 240 deviates from a total reflection condition due to diffraction and reflection, is emitted from the light guide panel 221, and enters the eye 21 of the viewer. Here, in the traveling direction of the parallel light beam, the number of times of reflection inside the light guide panel 221 varies depending on the angle of view. That is, the optical path length varies. However, since all the propagating light beams are parallel light beams, the group of light beams travels as if they were being folded. Therefore, as for the light of the X-direction component in the X-Y plane, the distance $L_2$ from the center of the first diffraction grating member 230 to the center of the second diffraction grating member 240 can be ignored, and an actual distance from the center of the collimator optical system 112 to the eye 21 becomes $(L_1+L_3)$. Also, the structure can be substantially regarded as a telecentric optical system, and as for the light of the X-direction component in the X-Y plane, a position of the first diffraction grating member 230 serves as an exit pupil position.

On the other hand, as for the incident light beam $R_1$, $R_2$, $R_3$ in the X-Z plane, the X-direction component is repeatedly reflected inside the light guide panel 221, but a Z-direction component reaches the second diffraction grating member 240 without being reflected. That is, light emitted from the collimator optical system 112 is converged in the X-Z plane, enters from the first surface 222, and travels in the Y-direction inside the light guide panel 221. Then, these light beams travel while being reflected from the first surface 222 and the second surface 223 of the light guide panel 221 so as to narrow in the Z-direction, reach the second diffraction grating member 240, are reflected and diffracted by the second diffraction grating member 240 to be emitted and enter the eye 21 of the viewer. That is, as for the light of the Z-direction component in the X-Z plane, the distance $L_2$ from the center of the first diffraction grating member 230 to the center of the second diffraction grating member 240 needs to be taken into consideration, and as shown in FIG. 21 or 22, when an angle of total reflection is assumed to be $\phi$, the actual distance from the center of the collimator optical system 112 to the eye 21 becomes almost $(L_1+L_2/\sin(\phi)+L_3)$. Also, the structure is a non-telecentric optical system, and, as for the light of the Z-direction component in the X-Z plane, a position of the eye 21 or a position near the eye 21 serves as the exit pupil position.

Hence, as shown in FIG. 24A, for example, as for incident light $R_3$', light in a spatial region marked with an oblique line from top right toward bottom left reaches the eye 21, but light in a spatial region marked with an oblique line from top left toward bottom right does not reach the eye 21. That is, some of the light beams do not reach the eye 21, and a kind of vignetting arises. In other words, there is a problem of low utilization efficiency of light emitted from the image generating device 111, and due to the low utilization efficiency of this light, there is a problem of bringing about increased power consumption in the image generating device 111.

When the emitting solid angle $\omega_{out}$ of the incident light $R_3$' is made larger than that shown in FIG. 24A, it becomes possible to reduce the vignetting. To that end, in a case where the image generating device 111 includes a light source (not shown) and a transmissive liquid crystal display device formed with pixels arranged in a two-dimensional matrix, light from the light source needs to be caused to enter the image generating device 111 at a larger incident solid angle. However, when light from the light source is caused to enter a pixel of the transmissive liquid crystal display device at a large incident solid angle, an angle of a light beam that enters a liquid crystal layer is far different from a right angle, and birefringence occurs, resulting in ovalization of linearly-polarized light or a low extinction ratio in the entire polarizer including an incident-side polarizer and an emitting-side polarizer in combination, and thus a decreased contrast in an image arises. That is, when light from the light source is caused to enter the image generating device at a large incident solid angle so as to secure a sufficient emitting solid angle $\omega_{out}$ from the transmissive liquid crystal display device necessary for preventing occurrence of vignetting, then a contrast in an image lowers. Hence, it is necessary to secure a large emitting solid angle $\omega_{out}$ from the transmissive liquid crystal display device so as to prevent occurrence of vignetting, while restraining degradation of an image contrast by causing light from the light source to enter the pixels of the transmissive liquid crystal display device at a small incident solid angle.

For example, From Japanese Patent Application Laid-Open No. 10-170859 there is known an image display apparatus that displays an image on a display surface formed with a plurality of pixels of an image generating unit, guides a light beam emitted from the image subjected to transmission illumination by an illuminating unit toward an eye of a viewer via an optical system, and causes a virtual image of the image formed with the light beam to be visually recognized by the viewer. In this image display apparatus, a first direction is set in a virtual image forming plane, a second direction substantially perpendicular to the first direction is set, and the light beam emitted from each pixel is controlled for each pixel in terms of divergence angles thereof in the first direction and the second direction by a divergence angle converting unit provided near the pixel, and enters the optical system as a light beam having a divergence angle in the first direction different from a divergence angle in the second direction. In this manner, a light beam having a divergence angle in the first direction different from a divergence angle in the second direction is caused to enter the optical system, so that an improvement can be made on the low utilization efficiency of light. However, it is difficult to simultaneously make an improvement on degradation of a contrast in an image and on occurrence of vignetting.

Therefore, a first object of the present disclosure is to provide an image display apparatus that has a configuration and a structure capable of restraining an undesired decreased contrast in an image while restraining occurrence of vignetting, an image generating device suitable for use in the image display apparatus, and a transmissive spatial light modulating device suitable for use in the image generating device. Furthermore, a second object of the present disclosure, in addition to the first object, is to provide an image display apparatus that has a configuration and a structure capable of increasing the utilization efficiency of light emitted from an image generating device and achieving a further reduction in power consumption in the image generating device, an image generating device suitable for use in the image display apparatus, and a transmissive spatial light modulating device suitable for use in the image generating device.

Solutions to Problems

An image display apparatus of the present disclosure for achieving the above first object includes:

(A) an image generating device including a light source and a transmissive spatial light modulating device formed with pixels arranged in a two-dimensional matrix; and (B) a light guiding unit that guides light from the image generating device and emits the light toward an eye of a viewer, wherein the transmissive spatial light modulating device includes, on the light emitting side thereof, a microlens array including a microlens corresponding to each pixel, and when an incident solid angle of light entering a pixel from the light source is assumed to be $\omega_{in}$, and an emitting solid angle of light that passes through the pixel and is emitted from the microlens corresponding to the pixel is assumed to be $\omega_{out}$, $\omega_{out} > \omega_{in}$ is satisfied.

An image generating device of the present disclosure for achieving the above first object is an image generating device that propagates incident light therein by total reflection, and then emits the light toward a light guiding unit including a light guide panel emitting light with a deflecting unit, the image generating device including a light source and a transmissive spatial light modulating device formed with pixels arranged in a two-dimensional matrix, wherein the transmissive spatial light modulating device includes, on the light emitting side thereof, a microlens array including a microlens corresponding to each pixel, and when an incident solid angle of light entering a pixel from the light source is assumed to be $\omega_{in}$, and an emitting solid angle of light that passes through the pixel and is emitted from the microlens corresponding to the pixel is assumed to be $\omega_{out}$, $\omega_{out} > \omega_{in}$ is satisfied. It is to be noted that the term "total reflection" means total internal reflection or total reflection inside a light guide panel. The same applies to the description below.

A transmissive spatial light modulating device of the present disclosure for achieving the above first object is a transmissive spatial light modulating device formed with pixels arranged in a two-dimensional matrix, the transmissive spatial light modulating device including on a light emitting side thereof, a microlens array including a microlens corresponding to each pixel, wherein when an incident solid angle of light that is emitted from a light source and enters a pixel is assumed to be $\omega_{in}$, and an emitting solid angle of light that passes through the pixel and is emitted from the microlens corresponding to the pixel is assumed to be $\omega_{out}$, $\omega_{out} > \omega_{in}$ is satisfied.

Effects of the Invention

In an image display apparatus, an image generating device, or a transmissive spatial light modulating device of the present disclosure, when an incident solid angle of light that is emitted from the light source and enters a pixel is assumed to be $\omega_{in}$, and an emitting solid angle (spread angle of light) of light that passes through this pixel and is emitted from the microlens corresponding to this pixel is assumed to be $\omega_{out}$, $\omega_{out} > \omega_{in}$ is satisfied. Accordingly, light from the light source is caused to enter the transmissive spatial light modulating device at a small incident solid angle, so that occurrence of a decreased contrast in an image can be prevented. Furthermore, since the emitting solid angle of the light that is eventually emitted from the transmissive spatial light modulating device can be made large, vignetting arising in an image can be restrained.

BRIEF DESCRIPTION OF DRAWINGS

FIG. 11A and FIG. 11B are conceptual diagrams of an image display apparatus of Example 4.

MODES FOR CARRYING OUT THE INVENTION

Figure 1:
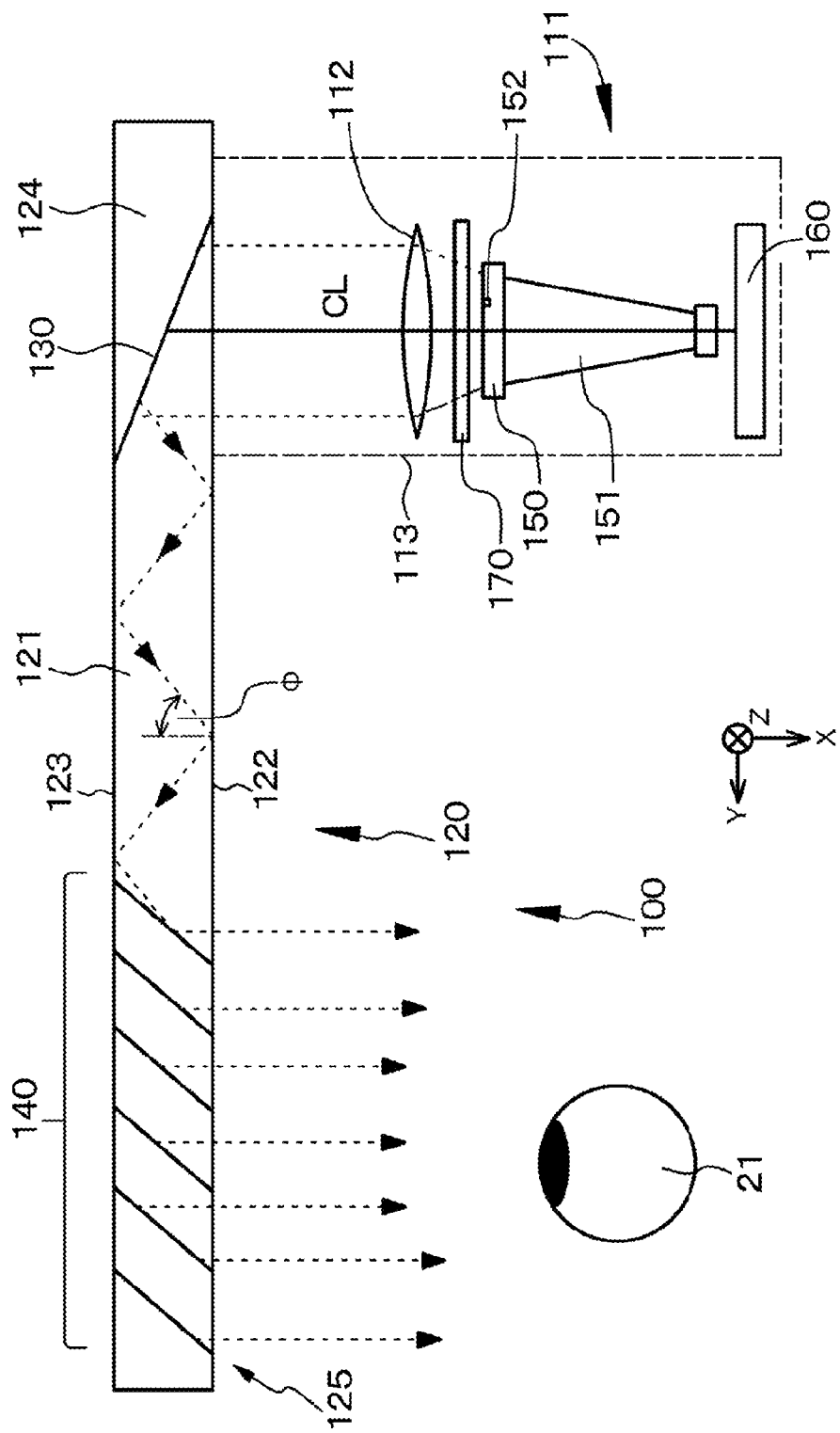
FIG. 1 is a conceptual diagram of an image display apparatus of Example 1.

Hereinafter, the present disclosure will be described based on embodiments with reference to the drawings; however, the present disclosure is not limited to those embodiments, and various numerical values and materials in the embodiments are illustrative. It is to be noted that description will be made in the following order.
1. General description of an image display apparatus, an image generating device, and a transmissive spatial light modulating device of the present disclosure
2. Example 1 (an image display apparatus, an image generating device, and a transmissive spatial light modulating device of the present disclosure)
3. Example 2 (a modification of Example 1)
4. Example 3 (a modification of Example 1 to Example 2)
5. Example 4 (a modification of Example 1 to Example 3)
6. Example 5 (a modification of Example 1 to Example 4)
7. Example 6 (other modification of Example 1 to Example 4)
8. Example 7 (a modification of Example 1 to Example 6)
9. Example 8 (a modification of Example 7) and others

General Description of an Image Display Apparatus, an Image Generating Device, and a Transmissive Spatial Light Modulating Device of the Present Disclosure A transmissive spatial light modulating device in an image display apparatus of the present disclosure, a transmissive spatial light modulating device in an image generating device of the present disclosure, or a transmissive spatial light modulating device of the present disclosure (hereinafter, those transmissive spatial light modulating devices will also be collectively and simply referred to as a "transmissive spatial light modulating device or the like of the present disclosure" in some cases) includes, on a light incident side thereof, a second microlens array including a second microlens corresponding to each pixel; and can have a mode where when an incident solid angle of light that enters the second microlens from a light source is assumed to be $\omega_{in-2}$, and an emitting solid angle (spread angle of light) of light that is emitted from the second microlens is assumed to be $\omega_{out-2}$, $\omega_{out} > \omega_{in} = \omega_{out-2}$ is satisfied.

Alternatively, the transmissive spatial light modulating device or the like of the present disclosure can have a mode of including a light diffuser panel on the light incident side thereof.

The image generating device in the image display apparatus of the present disclosure including the above described preferred modes, or the image generating device of the present disclosure further includes a light pipe, and can have a configuration where light emitted from the light source enters the transmissive spatial light modulating device via the light pipe. Here, the light pipe is an optical element that is used to obtain a uniform surface light source by reflecting light from a side surface of a polygonal column or a pyramid more than once, and is also be referred to as a homogenizer. There are a light pipe having the hollow inside and a side surface including a mirror, and a light pipe manufactured with a transparent material such as glass and utilizing total reflection from a side surface thereof.

In the image generating device in the image display apparatus of the present disclosure including the above described preferred modes and configurations, or in the image generating device of the present disclosure, a configuration can be adopted where when a point at which light emitted from the center of the image generating device enters a light guiding unit is assumed to be a point O, a normal in a portion of the light guiding unit passing through the point O is assumed to be an X-axis, an axis line of the light guiding unit in the portion of the light guiding unit passing through the point O is assumed to be a Y-axis, an optical axis of the light that is emitted from the center of the image generating device and enters the light guiding unit at the point O is assumed to be a $\zeta$-axis, and a virtual plane including the $\zeta$-axis and the Y-axis is assumed to be a $\zeta$-Y plane, light that is emitted from the image generating device and enters the light guiding unit at a point $(0, Y_1, Z_1)$ forms an angle (tilt angle) $\theta_Z$ with the $\zeta$-Y plane and forms an angle $\theta_1$ with an X-Z plane; and in a case of $Z_1 \neq 0$, $\theta_Z \neq \theta_Y$ is satisfied. In this manner, satisfying $\theta_Z \neq \theta_Y$ in a case of $Z_1 \neq 0$ results in that occurrence of a phenomenon where when some of light beams emitted from the light guiding unit do not reach an eye and a kind of vignetting arises can be more reliably restrained and that further improvement of the utilization efficiency of light emitted from the image generating device can be realized, and thus a further decrease in power consumption in the image generating device can be realized. That is, the above described second object of the present disclosure can be achieved.

Then, in such a configuration, a configuration can be adopted where a value of $\theta_Y$ is constant, regardless of a value of $Y_1$, and as an absolute value of $Z_1$ increases, an absolute value of the tilt angle $\theta_Z$ increases. Then, a mode can be adopted where as the absolute value of $Z_1$ increases, the absolute value of the tilt angle $\theta_Z$ increases monotonically or increases stepwise. When the value of $\theta_Y$ is made constant, regardless of the value of $Y_1$, specifically, but not limited thereto, it is only necessary to be $\theta_Y = 0$, for example. Further, a configuration can be adopted where an amount of deviation of an optical axis of a pixel from an optical axis of the microlens corresponding to this pixel is defined based on a value of $(0, Y_1, Z_1)$. Alternatively, a configuration can also be adopted where instead of causing the optical axis of a pixel to deviate from the optical axis of the microlens corresponding to this pixel based on the value of $(0, Y_1, Z_1)$, the optical axis of the microlens is tilted based on the value of $(0, Y_1, Z_1)$, and in this case, it is only necessary to appropriately design the curvature of a light emitting surface of the microlens.

In the transmissive spatial light modulating device or the like of the present disclosure including the above described preferred modes and configurations, a mode can be adopted where the microlens array is formed with a cylindrical lens array or an anomorphic lens array. Likewise, a mode can be adopted where the second microlens array is formed with a cylindrical lens array or an anomorphic lens array. In this case, the emitting solid angle (spread angle of light) of light that is emitted from the microlens is an angle formed when light is projected onto a virtual plane perpendicular to an axis line (the cylindrical axis) of the microlens.

Further, in the image generating device of the present disclosure including the above described preferred modes and configurations, a mode can be adopted where a deflecting unit includes:

a first deflecting unit that defects light that has entered a light guide panel so that the light that has entered the light guide panel is totally reflected inside the light guide panel; and a second deflecting unit that deflects, more than once, the light propagated inside the light guide panel by total reflection so that the light propagated inside the light guide panel by total reflection is emitted from the light guide panel.

Further, in the image display apparatus or the image generating device of the present disclosure including the above described preferred modes and configurations, a mode can be adopted where the light guiding unit includes:

(B-1) a light guide panel that propagates incident light therein by total reflection, and then emits the light;

(B-2) a first deflecting unit that deflects light that has entered the light guide panel so that the light that has entered the light guide panel is totally reflected inside the light guide panel; and (B-3) a second deflecting unit that deflects, more than once, the light propagated inside the light guide panel by total reflection so that the light propagated inside the light guide panel by total reflection is emitted from the light guide panel.

Further, a configuration can be adopted where the transmissive spatial light modulating device or the like of the present disclosure including the above described preferred modes and configurations is formed with a transmissive liquid crystal display device.

The microlens or the microlens array, and the second microlens or the second microlens array can be manufactured by a known method. The microlens may have positive power or may have negative power. The microlens array may be disposed on a light emitting side of the transmissive spatial light modulating device, being adjacent to the transmissive spatial light modulating device or in contact with the transmissive spatial light modulating device, or may be integrally formed with the transmissive spatial light modulating device and disposed inside the transmissive spatial light modulating device. Likewise, the second microlens array may be disposed on the light incident side of the transmissive spatial light modulating device, being adjacent to the transmissive spatial light modulating device or in contact with the transmissive spatial light modulating device, or may be integrally formed with the transmissive spatial light modulating device and disposed inside the transmissive spatial light modulating device. When being integrally formed with the transmissive spatial light modulating device and disposed inside the transmissive spatial light modulating device, the microlens or the second microlens can be formed by forming a concave portion in an inner surface of a transparent substrate constituting the transmissive spatial light modulating device, and filling this concave portion with a transparent material having a different refractive index from a refractive index of a material constituting the transparent substrate.

Examples of the light source can include a light emitting element, for example, an LED. Examples of the light emitting element constituting the light source can include a red light emitting element, a green light emitting element, a blue light emitting element, and a white light emitting element, and also alternatively, red light, green light, and blue light that are emitted from a red light emitting element, a green light emitting element, and a blue light emitting element may be mixed and subjected to luminance homogenization with the use of a light pipe, to obtain white light. The number of pixels only needs to be determined based on the specifications required for the image display apparatus, and examples of specific values can include 320×240, 432×240, 640×480, 854×480, 1024×768, and 1920×1080.

Furthermore, it is preferable to adopt a configuration where a parallel light emitting optical system formed with a collimator optical system that converts light emitted from the transmissive spatial light modulating device into a parallel light beam is provided, and light from the parallel light emitting optical system (collimator optical system) enters the light guiding unit. Examples of the parallel light emitting optical system (collimator optical system) can include an optical system that is formed with a convex lens, a concave lens, an adjustable-surface prism or a hologram lens alone or a combination thereof, and that generally has positive optical power. Between the parallel light emitting optical system (collimator optical system) and the light guiding unit, a light shielding member having an opening may be placed so as to prevent undesired light from being emitted from the parallel light emitting optical system and entering the light guiding unit. Light that has been converted into a plurality of parallel light beams by the parallel light emitting optical system formed with a collimator optical system is caused to enter the light guide panel, and such a demand of being parallel light beams is based on the fact that optical wavefront information at the time when the light enters the light guide panel needs to be stored also after the light is emitted from the light guide panel via the first deflecting unit and the second deflecting unit. It is to be noted that in order to generate a plurality of parallel light beams, specifically, it is only necessary to locate a light emitting portion of the image generating device in a location (position) at the focal distance in the parallel light emitting optical system, for example. The parallel light emitting optical system has a function of converting positional information of a pixel into angular information in the light guiding unit.

A light beam that is emitted from the center of the image generating device, passes through a nodal point of the parallel light emitting optical system on the side of the image generating device, and enters the light guiding unit will be referred to as a "center incident light beam". The center incident light beam enters the light guiding unit at the point O. This point O will be referred to as a light guiding unit center point in some cases. As described above, an axis line that passes through the light guiding unit center point and is parallel to the direction of the axis line of the light guiding unit is assumed to be the Y-axis, and an axis line that passes through the light guiding unit center point and coincides with the normal of the light guiding unit is assumed to be the X-axis.

A configuration can be adopted where the first deflecting unit reflects light that has entered the light guide panel, and the second deflecting unit transmits and reflects, more than once, the light propagated inside the light guide panel by total reflection. Then, in this case, a configuration can be adopted where the first deflecting unit functions as a reflecting mirror, and the second deflecting unit functions as a semi-transmissive mirror. It is to be noted that for convenience, such a light guiding unit will be referred to as a "light guiding unit of first mode".

In such a configuration, the first deflecting unit can include a metal including an alloy, for example, and can include a light reflecting film (a kind of mirror) that reflects light that has entered the light guide panel, or a diffraction grating (for example, a hologram diffraction grating film) that diffracts light that has entered the light guide panel. Furthermore, the second deflecting unit can include a multi-layer stack structure in which dielectric laminated films are numerously stacked, a half mirror, a polarizing beam splitter, or a hologram diffraction grating film. The first deflecting unit and the second deflecting unit are disposed inside the light guide panel (incorporated into the light guide panel), and in the first deflecting unit, a parallel light beam that has entered the light guide panel is reflected or diffracted so that the parallel light beam that has entered the light guide panel is totally reflected inside the light guide panel. In the second deflecting unit, on the other hand, the parallel light beam propagated inside the light guide panel by total reflection is reflected or diffracted more than once, and is emitted as a parallel light beam from the light guide panel.

Alternatively, a configuration can also be adopted where the first deflecting unit diffracts light that has entered the light guide panel, and the second deflecting unit diffracts, more than once, the light propagated inside the light guide panel by total reflection. It is to be noted that for convenience, such a light guiding unit will be referred to as a "light guiding unit of second mode". Then, in this case, a mode can be adopted where the first deflecting unit and the second deflecting unit are formed with a diffraction grating element, and further, a configuration can be adopted where the diffraction grating element is formed with a reflective diffraction grating element or formed with a transmissive diffraction grating element, or one of the diffraction grating elements is formed with the reflective diffraction grating element and the other diffraction grating element is formed with the transmissive diffraction grating element. An example of the reflective diffraction grating element can include a reflective volume hologram diffraction grating. The first deflecting unit formed with a reflective volume hologram diffraction grating will be referred to as a "first diffraction grating member" for convenience, and the second deflecting unit formed with a reflective volume hologram diffraction grating will be referred to as a "second diffraction grating member", for convenience in some cases. The direction in which interference fringes are aligned in a diffraction grating, or the diffraction direction, is the Y-direction, and the interference fringes extend in the Z-direction.

With the image display apparatus of the present disclosure, an image in a single color (green, for example) can be displayed, and in a case where a color image is to be displayed, a configuration can be adopted where the first diffraction grating member or the second diffraction grating member are formed by stacking P diffraction grating layers that are formed with a reflective volume hologram diffraction grating, so as to adapt for diffraction and reflection of P types (P=3: three colors of red, green, and blue, for example) of light having different P types of wavelength bands (or wavelengths). An interference fringe adapted for one type of wavelength band (or wavelength) is formed in each diffraction grating layer. Alternatively, a configuration can also be adopted where P types of interference fringes are formed in the first diffraction grating member or the second diffraction grating member formed with a single diffraction grating layer, so as to adapt for diffraction and reflection of P types of light having different P types of wavelength bands (or wavelengths). Alternatively, a configuration can also be adopted where the angle of view is equally divided into three, and the first diffraction grating member or the second diffraction grating member is formed by stacking diffraction grating layers corresponding to the respective angles of view. Then, these configurations are adopted, so that increased diffraction efficiency, a large diffraction acceptance angle, and an optimized diffraction angle at the time when light having each wavelength band (or wavelength) is diffracted and reflected by the first diffraction grating member or the second diffraction grating member can be realized.

An example of materials constituting the first diffraction grating member and the second diffraction grating member can include a photopolymer material. The constituent materials and the fundamental structures of the first diffraction grating member and the second diffraction grating member formed with a reflective volume hologram diffraction grating only need to be made the same as the constituent material and the structure of a reflective volume hologram diffraction grating of the related art. The reflective volume hologram diffraction grating means a hologram diffraction grating that diffracts and reflects only positive first-order diffracted light. An interference fringe is formed in the diffraction grating member from the inside to a surface thereof, and a formation method of the interference fringe itself only needs to be the same as a formation method of the related art. Specifically, for example, it is only necessary to irradiate a member (a photopolymer material, for example) constituting the diffraction grating member with object light from a first predetermined direction of one side thereof, and at the same time, irradiate the member of the diffraction grating member with reference light from a second predetermined direction of the other side thereof, and recode the interference fringe formed by the object light and the reference light inside the member constituting the diffraction grating member. The first predetermined direction, the second predetermined direction, and wavelengths of the object light and the reference light are appropriately selected, so that a desired pitch of interference fringes and a desired tilt angle (slant angle) of an interference fringe on a surface of the diffraction grating member can be obtained. The tilt angle (slant angle) of an interference fringe means an angle formed between the surface of the diffraction grating member (or the diffraction grating layer) and the interference fringe. In a case where the first diffraction grating member and the second diffraction grating member include a stack structure of P diffraction grating layers formed with a reflective volume hologram diffraction grating, such a stack of the P diffraction grating layers only needs to be made by manufacturing separately each P diffraction grating layer and then stacking (bonding) the P diffraction grating layers, for example, with the use of an ultraviolet cure adhesive. The P diffraction grating layers may also be manufactured by manufacturing one diffraction grating layer with an adhesive photopolymer material, and then sequentially bonding adhesive photopolymer materials thereon to manufacture diffraction grating layers.

Alternatively, in the image display apparatus of the present disclosure, a mode can be adopted where the light guiding unit includes a semi-transmissive mirror that receives light emitted from the image generating device and emits the light toward an eye of a viewer. A structure may be adopted where the light emitted from the image generating device propagates through the air and then enters the semi-transmissive mirror, or a structure may be adopted where the light propagates inside a transparent member such as a glass panel and a plastic panel (specifically, a member formed with the same material as a material constituting the later described light guide panel) and enters the semi-transmissive mirror. The semi-transmissive mirror may be attached to the image generating device via this transparent member, or the semi-transmissive mirror may be attached to the image generating device via a member different from this transparent member.

In the image display apparatus, the light guide panel has two parallel surfaces (a first surface and a second surface) that extend parallel to the direction of light propagated by total reflection inside the light guide panel (Y-direction). When a surface of the light guide panel that receives light is assumed to be an incident surface of the light guide panel, and a surface of the light guide panel from which light is emitted is assumed to be an emitting surface of the light guide panel, the first surface may constitute the incident surface of the light guide panel and the emitting surface of the light guide panel, or the first surface may constitute the incident surface of the light guide panel and the second surface may constitute the emitting surface of the light guide panel.

Examples of a material constituting the light guide panel can include glass including optical glass such as silica glass and BK7, and a plastic material (for example, PMMA, a polycarbonate resin, an acrylic resin, a non-crystalline polypropylene resin, and a styrene resin including an acrylonitrile-styrene resin). The shape of the light guide panel is not limited to a flat plate, but may have a curved shape.

The image display apparatus of the present disclosure can constitute, for example, a head mounted display (HMD), and can realize a reduction in the weight and the size of the apparatus, and it becomes possible to greatly ease the discomfort in wearing the apparatus, and further, it also becomes possible to realize a manufacturing cost reduction.

The head mounted display includes:

(i) an eyeglass-type frame to be mounted on the head of a viewer; and (ii) the image display apparatus of the present disclosure. The head mounted display may include the one image display apparatus of the present disclosure (a monocular type), or may include the two image display apparatuses of the present disclosure (a binocular type). The light guiding unit can be made as a semi-transmissive type (a see-through type). Specifically, at least a portion of the light guiding unit facing an eye (both eyes) of the viewer is made semi-transmissive (see-through), and the viewer can see the outside through this portion of the light guiding unit.

The frame is formed with a front unit to be placed on the front side of the viewer, two temple units rotatably attached to both ends of the front unit via a hinge, and an end cover attached to a tip of each temple unit, and further includes a nose pad. When the entire head mounted display is viewed, an assembly of the frame and the nose pad has substantially the same structure as regular glasses, except that there is no rim. A material constituting the frame can include the same material as a material constituting regular glasses, such as a metal, an alloy, plastic, and a combination thereof. The nose pad can also have a known configuration and structure.

Then, in terms of the design of the head mounted display or easiness in wearing the head mounted display, it is desirable to adopt an mode where wires (such as signal wires and power wires) from the one or two image generating devices extend from the tip of the end cover to the outside via the insides of the temple unit and the end cover, and are connected to a control device (a control unit or a control circuit). Further, it is desirable to adopt a mode where each of the image generating devices includes a headphone unit, and wires for headphone unit from each image generating device extend from the tip of the end cover to the headphone unit via the insides of the temple unit and the end cover. Examples of the headphone unit can include an in-ear type headphone unit and a canal type headphone unit. More specifically, the wires for headphone unit extend from the tip of the end cover to the headphone unit in a manner of wrapping around the back of the auricle (ear capsule).

In the head mounted display, a mode can be adopted where an imaging device is attached to a center portion of the front unit. Specifically, the imaging device includes a solid-state imaging element formed with, for example, a CCD or a CMOS sensor, and a lens. For example, the wires from the imaging device only need to be connected to one of the image display apparatuses through a back surface of the front unit, or only need to be further included in the wires extending from the image generating devices.

In the image display apparatus of the present disclosure, a configuration can be adopted, but not limited thereto, where the center incident light beam intersects with the X-Y plane at an angle other than 0 degrees ($\theta_{Z0} \neq 0$ degrees), or an incident angle on the X-Y plane (X-Y plane incident angle) $\theta_{Z0}$ is $\theta_{Z0} \neq 0$ degrees, and thus restrictions on the mounting angle of the image display apparatus at the time of attaching the image display apparatus to an attachment unit of the eyeglass-type frame lessen, and a high degree of freedom in designing can be obtained. Assuming that the X-Y plane coincides with a horizontal plane, a configuration can be adopted where the angle $\theta_{Z0}$ at which the center incident light beam intersects with the X-Y plane is an elevation angle. That is, a configuration can be adopted where the center incident light beam travels from the lower side of the X-Y plane toward the X-Y plane, and collides with the X-Y plane. Then, in this case, the X-Y plane preferably intersects with a vertical plane at an angle other than 0 degrees, and further preferably, the X-Y plane intersects with the vertical plane at an angle $\theta_{Z0}'$. It is to be noted that an example of a maximum value of $\theta_{Z0}'$ can include, but not limited thereto, 5 degrees. Here, the horizontal plane is a plane that includes the line of sight of a viewer viewing an object located in the horizontal direction (for example, an object in an infinite direction or the horizon) (the "horizontal line of sight of a viewer"), and includes two eyes of a viewer located horizontally. Furthermore, the vertical plane is a plane perpendicular to this horizontal plane. Alternatively, a mode can also be adopted where when the viewer sees an object located in the horizontal direction (for example, an object in an infinite direction or the horizon), the center incident light beam that is emitted from the light guiding unit and enters an eye of the viewer forms a depression angle. Examples of the depression angle with respect to the horizontal plane can include 5 degrees to 45 degrees.

In a case where the head mounted display is made as a binocular type, it is preferable to adopt a configuration where the light guiding unit is placed closer to the center of the face of the viewer than the image generating devices, as a whole, and further has a joining member that joins the two image display apparatuses, the joining member is preferably attached to the viewer-facing side of the center portion of the frame located between the two eyes of the viewer, and a projected image of the joining member is included in a projected image of the frame.

In this manner, when a structure is adopted where the joining member is attached to the center portion of the frame located between the two eyes of the viewer, that is, unless a structure is adopted where the image display apparatus is attached directly to the frame, when the viewer wears the frame on the head, the temple unit becomes in a state of spreading toward the outer side, and as a result, even when the frame is deformed, displacement (a change in position) of the image generating devices or the light guiding units due to the deformation of the frame does not arise, or if arises, extremely small displacement. Hence, a change in the angle of convergence of right and left images can be reliably prevented. Furthermore, since there is no need to increase the rigidity of the front unit of the frame, an increased weight of the frame, low designability, and an increased cost are not brought about. Also, since the image display apparatus is not attached directly to the eyeglass-type frame, it is possible to freely select the design, the color and the like of the frame according to a viewer's preference, and also there are fewer restrictions on the design of the frame and a high degree of freedom in designing. In addition, the joining member is placed between the viewer and the frame, and also the projected image of the joining member is included in the projected image of the frame. In other words, when the head mounted display is seen from the front of the viewer, the joining member is hidden by the frame. Accordingly, high designablity, design characteristics, can be given to the head mounted display.

It is to be noted that it is preferable to adopt a configuration where the joining member is attached to the viewer-facing side of the center portion (equivalent to a bridge portion in regular glasses) of the front unit located between the two eyes of the viewer.

While the two image display apparatuses are joined by the joining member, specifically, a mode can be adopted where the image generating device is attached to each end of the joining member in such a manner that an attachment state is adjustable. Then, in this case, it is preferable to adopt a configuration where each image generating device is located on the outer side of the eye of the viewer. Further, in such a configuration, when a distance between the attachment unit center of one of the image generating devices and one end (one of endpieces) of the frame is assumed to be $\alpha$, a distance between the center of the joining member and the one end (one of the endpieces) of the frame is assumed to be $\beta$, a distance between the attachment unit center of the other image generating device and the one end (one of the endpieces) of the frame is assumed to be $\gamma$, and the length of the frame is assumed to be L, it is desirable to satisfy $0.01 \times L \leq \alpha \leq 0.30 \times L$, preferably, $0.05 \times L \leq \alpha \leq 0.25 \times L$, $0.35 \times L \leq \beta \leq 0.65 \times L$, preferably, $0.45 \times L \leq \beta \leq 0.55 \times L$, $0.70 \times L \leq \gamma \leq 0.99 \times L$, preferably, $0.75 \times L \leq \gamma \leq 0.95 \times L$. Specifically, the image generating device is attached to each end of the joining member, for example, by providing three through holes in each end of the joining member, and providing screw portions corresponding to the through holes in the image generating device, passing screws through the respective through holes, and screwing the screws to the screw portions provided in the image generating device. A spring is inserted in advance between each screw and each screw portion. In this manner, the attachment state of the image generating device (a tilt of the image generating device with respect to the joining member) can be adjusted by fastened states of the screws.

Here, the attachment unit center of the image generating device refers to, in a state of the image generating device attached to the joining member, a bisection point along the direction of the axis line of the frame of an overlapping portion between the projected image of the image generating device obtained when the image generating device and the frame are projected onto a virtual plane and the projected image of the frame. Also, the center of the joining member refers to, in a state of the joining member attached to the frame, a bisection point along the direction of the axis line of the frame of a portion where the joining member is in contact with the frame. In a case where the frame is curved, the length of the frame refers to the length of the projected image of the frame. It is to be noted that the direction of projection is assumed to be a direction perpendicular to the face of the viewer.

Alternatively, while the two image display apparatuses are joined by the joining member, specifically, a mode can also be adopted where the joining member joins the two light guiding units. There is a case where the two light guiding units are integrally manufactured, and in such a case, while the joining member is attached to the light guiding units integrally manufactured, such a mode is also included in the mode where the joining member joins the two light guiding units. When a distance between the center of one of the image generating devices and one end of the frame is assumed to be $\alpha'$, and a distance between the center of the other image generating device and the one end of the frame is assumed to be $\gamma'$, it is desirable to make a value of $\alpha'$ and a value of $\gamma'$ the same as the value of $\alpha$ and the value of $\gamma$ described above. The center of an image generating device refers to, in a state of the image generating device attached to the light guiding unit, a bisection point along the direction of the axis line of the frame of an overlapping portion between the projected image of the image generating device obtained when the image generating device and the frame are projected onto a virtual plane and the projected image of the frame.

The joining member has essentially any shape as long as the projected image of the joining member is included in the projected image of the frame, and for example, the shape of the joining member can include the shapes of a stick and an elongated plate. Examples of a material constituting the joining member can include a metal, an alloy, plastic, and a combination thereof.

Example 1

Figure 2A:
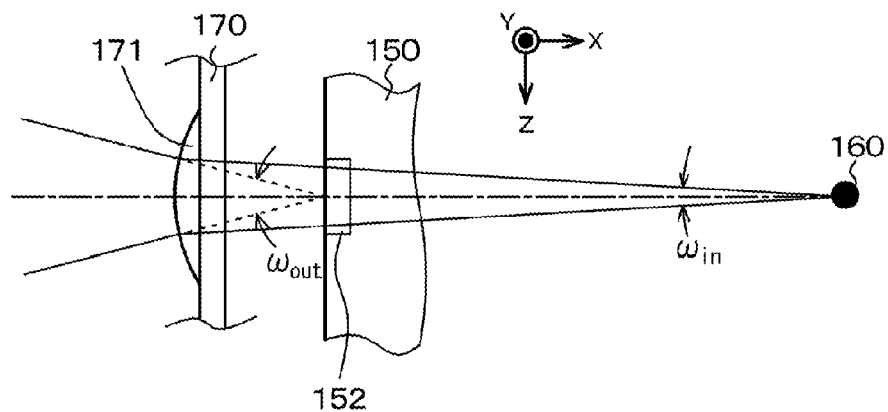
FIG. 2A and FIG. 2B are diagrams schematically showing a propagation state of light that enters a pixel located at the center of the image generating device of Example 1 and is emitted from this pixel, as seen from an X-Z plane and a propagation state of the light as seen from an X-Y plane, respectively.
Figure 2B:
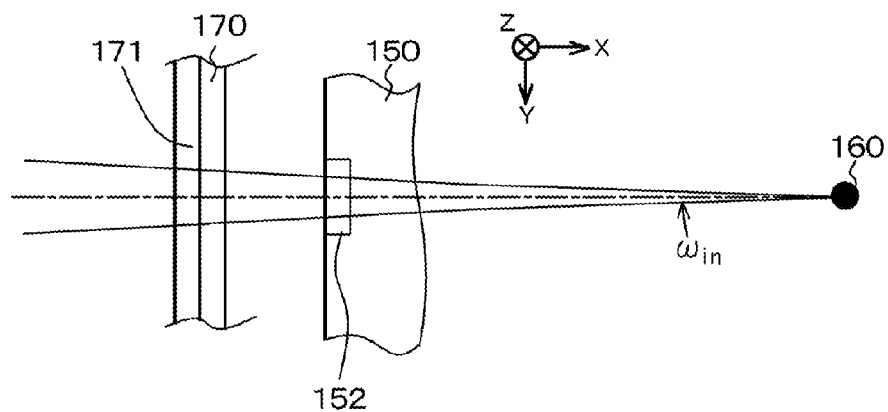
Figure 3:
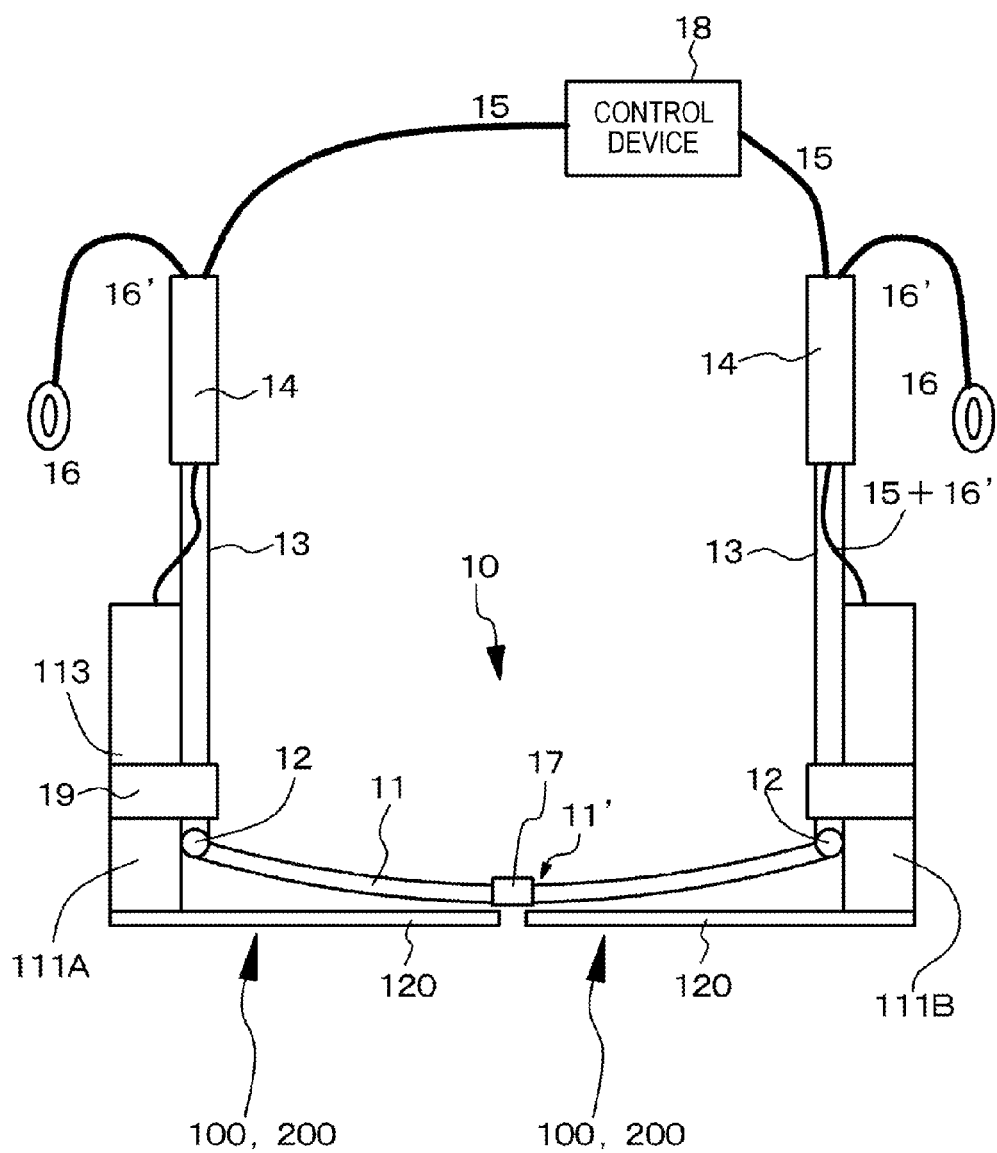
FIG. 3 is a schematic view of the image display apparatus of Example 1 as seen from above.
Figure 4:
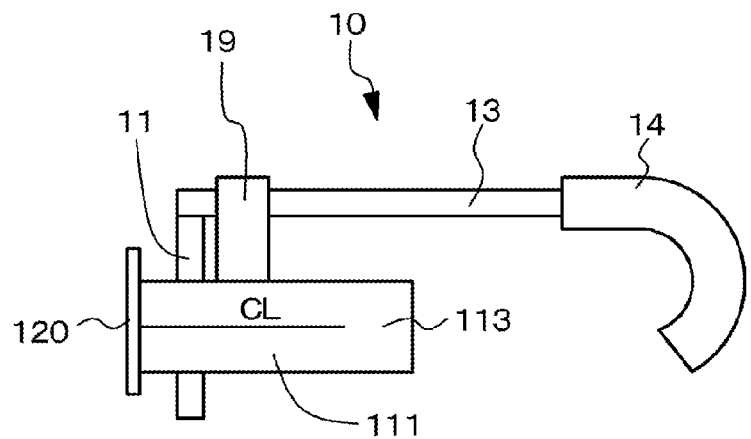
FIG. 4 is a schematic view of the image display apparatus of Example 1 as seen from a side.
Figure 5:
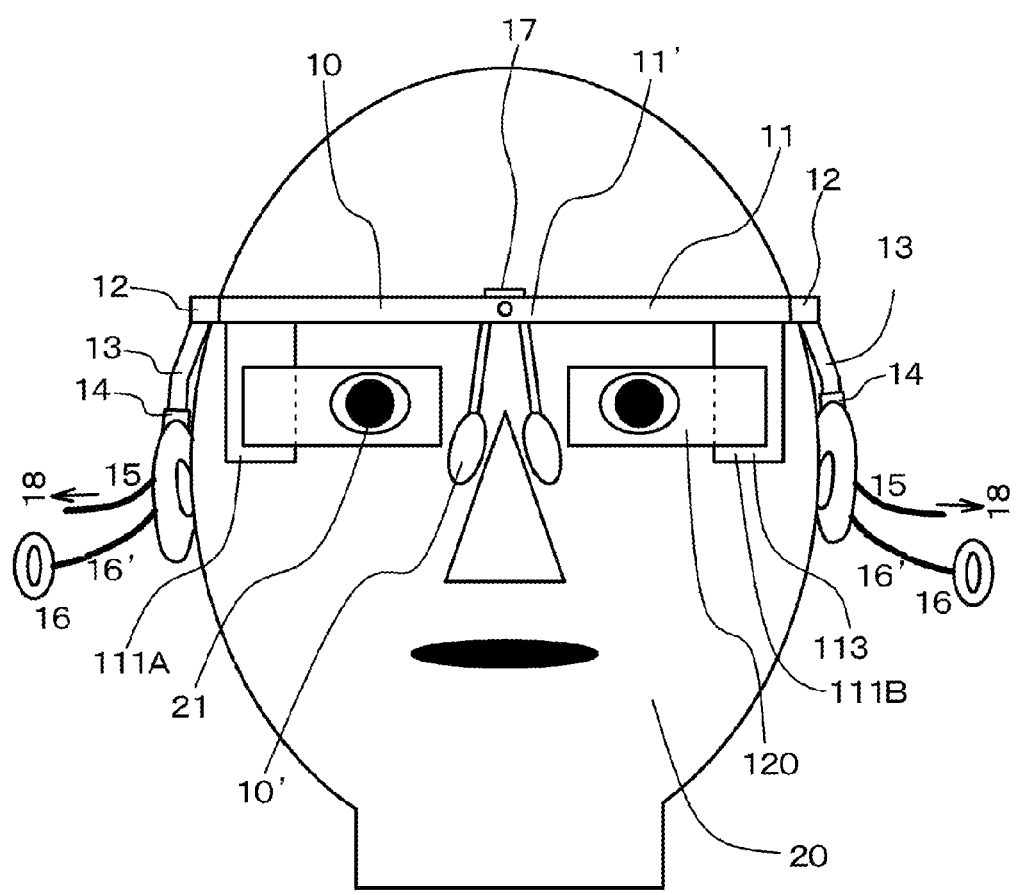
FIG. 5 is a schematic view of the image display apparatus of Example 1 as seen from the front.
Figure 6:
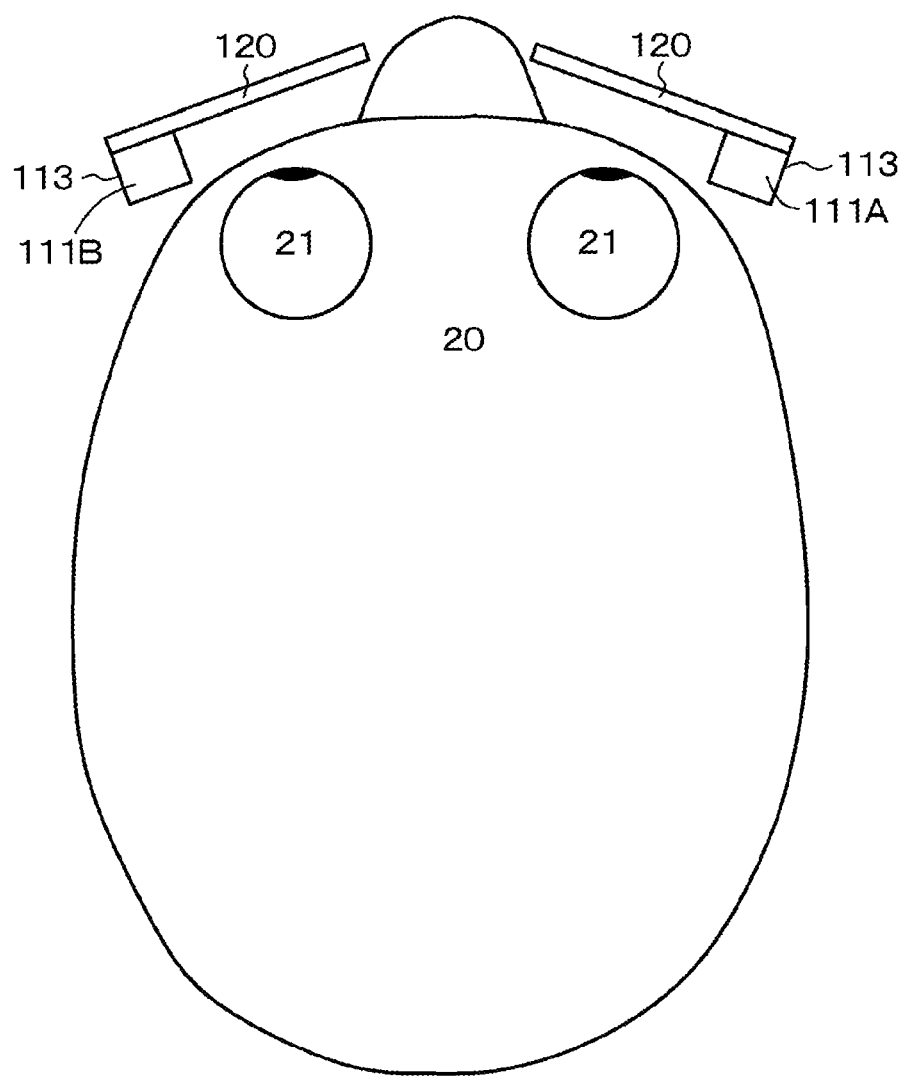
FIG. 6 is a diagram of the image display apparatus of Example 1 mounted on the head of a viewer, as seen from above (however, only the image display apparatus is shown, and a frame is not shown).

Example 1 relates to an image display apparatus, an image generating device, and a transmissive spatial light modulating device of the present disclosure and specifically, the image display apparatus of Example 1 includes a light guiding unit of first mode. FIG. 1 shows a conceptual diagram of the image display apparatus of Example 1, and the image display apparatus of Example 1 is incorporated into a head mounted display (HMD). Furthermore, FIG. 2A schematically shows a propagation state of light that enters a pixel located at the center of the image generating device of Example 1 and is emitted from this pixel, as seen from an X-Z plane, and FIG. 2B schematically shows a propagation state of the light as seen from an X-Y plane. Further, FIG. 3 shows a schematic view of the image display apparatus of Example 1 as seen from above, FIG. 4 shows a schematic view of the image display apparatus as seen from a side, FIG. 5 shows a schematic view of the image display apparatus as seen from the front, and FIG. 6 shows a diagram of a state where the image display apparatus of Example 1 is mounted on the head of a viewer as seen from above (however, only the image display apparatus is shown, and the frame is not shown).

An image display apparatus 100, 200, 300 of Example 1 or Example 2 to Example 8 described later includes:

(A) an image generating device 111 including a light source 160 and a transmissive spatial light modulating device 150 formed with pixels 152 arranged in a two-dimensional matrix; and (B) a light guiding unit 120, 220, 320 that guides light from the image generating device 111 and emits the light toward an eye 21 of a viewer 20. It is to be noted that for convenience, only one pixel 152 is shown in the drawings.

Furthermore, the image generating device 111 of Example 1 is an image generating device that propagates incident light therein by total reflection and then emits the light toward the light guiding unit 120, 220, 320 including a light guide panel emitting light with a deflecting unit, and includes the light source 160 and the transmissive spatial light modulating device 150 formed with the pixels 152 arranged in a two-dimensional matrix.

Then, the transmissive spatial light modulating device 150 in the image display apparatus 100, 200, 300 or the image generating device 111, or the transmissive spatial light modulating device 150 of Example 1 includes, on a light emitting side thereof, a microlens array 170 including a microlens 171 corresponding to each pixel 152, and when an incident solid angle of light that is emitted from the light source 160 (specifically, emitted from a light pipe 151 that will be described later) and enters a pixel 152 is assumed to be $\omega_{in}$, and an emitting solid angle (spread angle of light) of light that passes through this pixel 152 and is emitted from the microlens 171 corresponding to this pixel 152 is assumed to be $\omega_{out}$, $\omega_{out} > \omega_{in}$ is satisfied. In other words, the f-number of illumination light that illuminates the transmissive spatial light modulating device is greater than the f-number of image light that constitutes an image.

In the case of color display, one pixel includes a red light emitting sub pixel that emits red light, a green light emitting sub pixel that emits green light, and a blue light emitting sub pixel that emits blue light, and the sub pixels only need to be regarded as pixels. In Example 1 or Example 2 to Example 8 described later, the light source 160 constituting the image generating device 111 is formed with a light emitting diode that emits white light. Furthermore, specifically, the transmissive spatial light modulating device 150 is formed with a transmissive liquid crystal display device, and includes 640×480 pixels (liquid crystal cells), for example. The white light emitted from the light source 160 enters the transmissive spatial light modulating device 150 via the light pipe 151. The light pipe 151 is an optical element that is used to obtain a uniform surface light source by reflecting light from a side surface of a polygonal column or a pyramid more than once, and has the hollow inside and a side surface including a mirror. Alternatively, the light pipe 151 is manufactured from a transparent material such as glass, and utilizes total reflection from the side surface.

In Example 1 or Example 2 to Example 8 described later, the microlens array 170 formed with a plurality of microlenses 171 arranged in a two-dimensional matrix is disposed in the image generating device 111. Light that is emitted from each pixel 152 is emitted from the image generating device 111 through the microlens 171 corresponding to this pixel 152. The microlens 171 includes a cylindrical lens or an anamorphic lens, for example. Here, an axis line (cylindrical axe) of the microlens 171 extends parallel to the direction of the image generating device 111 corresponding to a Y-direction of the light guiding unit 120, 220, the cross-sectional shape of the microlens 171 cut on a virtual plane of the image generating device corresponding to the X-Z plane of the light guiding unit is a shape that partially has a curved line, such as a semicircle, a circular arc, or an ellipse, and the cross-sectional shape of the microlens 171 cut on a virtual plane of the image generating device corresponding to an Y-Z plane of the light guiding unit is mainly a rectangle. Accordingly, the emitting solid angle (spread angle of light) $\omega_{out}$ of light that is emitted from the microlens 171 is an angle formed when a light beam is projected onto the X-Z plane.

Here, the head mounted display includes:

(i) an eyeglass-type frame 10 to be mounted on the head of the viewer 20; and (ii) an image display apparatus 100, 200, 300. The head mounted display may include the one image display apparatus (a monocular type), or may include the two image display apparatuses (a binocular type), and in the examples, a binocular type including the two image display apparatuses has been described. The image display apparatus 100, 200, 300 may be fixedly attached to the frame, or may be detachably attached to the frame. The image generating device 111 displays an image in a single color (green, for example). Furthermore, the light guiding unit 120, 220, 320 is of a semi-transmissive type (a see-through type). Specifically, at least a portion of the light guiding unit facing the eye (both eyes) 21 of the viewer 20 (more specifically, a light guide panel 121, 221 and a second deflecting unit 140, 240 described later) is semi-transmissive (see-through).

In Example 1 or Example 2 to Example 8 described later, a point at which light (center incident light beam CL) that is emitted from the center of the image generating device 111, passes through a nodal point of a parallel light emitting optical system. 112 on the side of the image generating device and enters the light guiding unit 120, 220, 320 is assumed to be a point O (light guiding unit center point O), a normal in a portion of the light guiding unit 120, 220, 320 passing through the light guiding unit center point O is assumed to be an X-axis, and an axis line in the portion of the light guiding unit 120, 220, 320 passing through the light guiding unit center point O is assumed to be a Y-axis. A center point of a first deflecting unit 130, 230 is the light guiding unit center point O. Furthermore, an optical axis of light that is emitted from the center of the image generating device 111 and enters the light guiding unit 120, 220 at the point O (light guiding unit center point O) is assumed to be a $\zeta$-axis. Here, On the supposition of a ($\zeta$, $\eta$, $\xi$) orthogonal coordinate system, the relationship between an (X, Y, Z) orthogonal coordinate system and the ($\zeta$, $\eta$, $\xi$) orthogonal coordinate system is the relationship where on the supposition of the (x, y, z) orthogonal coordinate system at the time of rotating and moving the X-axis to coincide with the $\zeta$-axis, a $\eta$-axis coincides with a y-axis, and a $\xi$-axis coincides with a z-axis. It is to be noted that in Example 1 to Example 8, the $\zeta$-axis coincides with the X-axis, the $\eta$-axis coincides with the Y-axis, and the $\xi$-axis coincides with the Z-axis.

Then, the light guiding unit 120, 220 of Example 1 or Example 2 to Example 5, and Example 7 to Example 8 described later includes:

(B-1) the light guide panel 121, 221 that propagates incident light therein by total reflection, and then emits the light;

(B-2) the first deflecting unit 130, 230 that deflects light that has entered the light guide panel 121, 221, so that the light that has entered the light guide panel 121, 221 is totally reflected inside the light guide panel 121, 221; and (B-3) the second deflecting unit 140, 240 that deflects, more than once, the light propagated inside the light guide panel 121, 221 by total reflection, so that the light propagated inside the light guide panel 121, 221 by total reflection is emitted from the light guide panel 121, 221.

Alternatively, the deflecting unit includes:

the first deflecting unit 130, 230 that defects light that has entered the light guide panel 121, 221, so that the light that has entered the light guide panel 121, 221 is totally reflected inside the light guide panel 121, 221; and the second deflecting unit 140, 240 that deflects, more than once, the light propagated inside the light guide panel 121, 221 by total reflection, so that the light propagated inside the light guide panel 121, 221 by total reflection is emitted from the light guide panel.

In Example 1, the first deflecting unit 130 and the second deflecting unit 140 are disposed inside the light guide panel 121. Then, the first deflecting unit 130 reflects light that has entered the light guide panel 121, and the second deflecting unit 140 transmits and reflects, more than once, the light propagated inside the light guide panel 121 by total reflection. That is, the first deflecting unit 130 functions as a reflecting mirror, and the second deflecting unit 140 functions as a semi-transmissive mirror. More specifically, the first deflecting unit 130 provided inside the light guide panel 121 is formed with aluminum (Al), and includes a light reflecting film (a kind of mirror) that reflects light that has entered the light guide panel 121. Meanwhile, the second deflecting unit 140 provided inside the light guide panel 121 includes a multi-layer stack structure in which dielectric laminated films are numerously stacked. The dielectric laminated film includes a $TiO_2$ film as a high-dielectric-constant material and a $SiO_2$ film as a low-dielectric-constant material, for example. A multi-layer stack structure in which dielectric laminated films are numerously stacked is disclosed in JP 2005-521099 W. In the drawing, the six dielectric laminated films are shown, but the number of the dielectric laminated films is not limited thereto. A thin piece formed with the same material as a material constituting the light guide panel 121 is interposed between the dielectric laminated films. It is to be noted that in the first deflecting unit 130, a parallel light beam that has entered the light guide panel 121 is reflected (or diffracted), so that the parallel light beam that has entered the light guide panel 121 is totally reflected inside the light guide panel 121. In the second deflecting unit 140, on the other hand, the parallel light beam propagated inside the light guide panel 121 by total reflection is reflected (or diffracted) more than once, and is emitted as a parallel light beam from the light guide panel 121 toward the eye 21 of the viewer 20.

As for the first deflecting unit 130, it is only necessary to cut off a portion 124 in which the first deflecting unit 130 of the light guide panel 121 is provided to provide a slope on which the first deflecting unit 130 is to be formed in the light guide panel 121, and after a light reflecting film is vacuum-deposited on the slope, bond the cut off portion 124 of the light guide panel 121 to the first deflecting unit 130. Furthermore, as for the second deflecting unit 140, it is only necessary to manufacture a multi-layer stack structure in which materials (such as glass) same as the material constituting the light guide panel 121 and dielectric laminated films (that can be formed by a vacuum deposition method, for example) are numerously stacked, cut off a portion 125 in which the second deflecting unit 140 of the light guide panel 121 is provided to form a slope, bond the multi-layer stack structure to the slope, and perform polishing or the like for shaping. In this manner, the light guiding unit 120 having the first deflecting unit 130 and the second deflecting unit 140 provided inside the light guide panel 121 can be obtained.

Here, in Example 1 or Example 2 to Example 5 and Example 7 to Example 8 described later, the light guide panel 121, 221 formed with optical glass or a plastic material has two parallel surfaces (a first surface 122, 222 and a second surface 123, 223) that extend parallel to the direction (the Y-direction) of light propagation by total reflection inside the light guide panel 121, 221. The first surface 122, 222 and the second surface 123, 223 face each other. Then, a parallel light beam enters the first surface 122, 222, which is equivalent to a light incident surface, is propagated inside by total reflection, and then emitted from the first surface 122, 222, which is equivalent to a light emitting surface. However, the configuration is not limited thereto, and the second surface 123, 223 may constitute the light incident surface and the first surface 122, 222 may constitute the light emitting surface.

Each image generating device 111 is housed in a housing 113 (indicated by a dot-and-dash line in FIG. 1), an opening (not shown) is provided in the housing 113, and light is emitted from the parallel light emitting optical system (collimator optical system 112) via the opening.

The frame 10 is formed with a front unit 11 to be placed on the front side of the viewer 20, two temple units 13 rotatably attached to both ends of the front unit 11 via a hinge 12, and an end cover (also referred to as a tip cell, an ear cushion, or an ear pad) 14 attached to a tip of each temple unit 13. A nose pad 10' is also attached. That is, an assembly of the frame 10 and the nose pad 10' has basically substantially the same structure as regular glasses. Further, each housing 113 is attached to the temple unit 13 with an attachment member 19. The frame 10 is manufactured from a metal or plastic. Each housing 113 may be detachably attached to the temple unit 13 with the attachment member 19. Furthermore, as for a viewer who owns and wears glasses, each housing 113 may be detachably attached to a temple unit of a frame of the viewer's own glasses with the attachment member 19.

Further, wires (such as signal wires and power wires) 15 extending from an image generating device 111A, 111B extend from the tip of the end cover 14 to the outside via the insides of the temple unit 13 and the end cover 14, and are connected to a control device (a control circuit or a control unit) 18. An image signal is wirelessly sent to the control device 18 from the outside, or an image signal (image data) is stored in the control device 18, for example. Then, in the control device 18, processing for displaying an image is performed on the image signal. The control device 18 can include a known circuit. Furthermore, each image generating device 111A, 111B includes a headphone unit 16, and wires for headphone unit 16' extending from each image generating device 111A, 111B extend from the tip of the end cover 14 to the headphone unit 16 via the insides of the temple unit 13 and the end cover 14. More specifically, the wires for headphone unit 16' extend from the tip of the end cover 14 to the headphone unit 16 in a manner of wrapping around the back of the auricle (ear capsule). With such a configuration, the headphone unit 16 and the wires for headphone unit 16' do not give an impression of being untidily placed, and a neat image display apparatus can be achieved.

Furthermore, an imaging device 17 that includes a solid-state imaging element (not shown) formed with a CCD or a CMOS sensor and a lens (not shown) is attached to a center portion 11' of the front unit 11 with an appropriate attachment member (not shown), where necessary. A signal from the imaging device 17 is sent to the image generating device 111A via a wire (not shown) extending from the imaging device 17.

In the image display apparatus, the image generating device, or the transmissive spatial light modulating device of Example 1, when an incident solid angle of light that is emitted from the light source and enters a pixel is assumed to be $\omega_{in}$, and an emitting solid angle of the light that passes through this pixel and is emitted from the microlens corresponding to this pixel is assumed to be $\omega_{out}$, $\omega_{out} > \omega_{in}$ is satisfied. Therefore, since even when light from the light source is caused to enter the transmissive spatial light modulating device at a small incident solid angle, the emitting solid angle of the light that is eventually emitted from the transmissive spatial light modulating device can be made large (see FIG. 2A), occurrence of a decreased contrast in an image can be prevented while vignetting arising in an image is restrained.

Figure 23A:
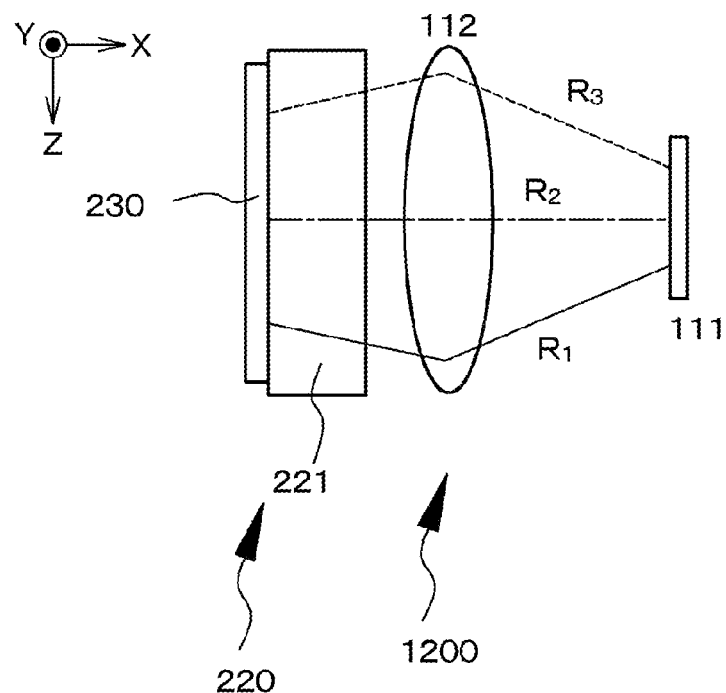
FIG. 23A is a conceptual diagram of the image display apparatus of the related art in the form shown in FIG. 22, as seen from another direction.
Figure 23B:
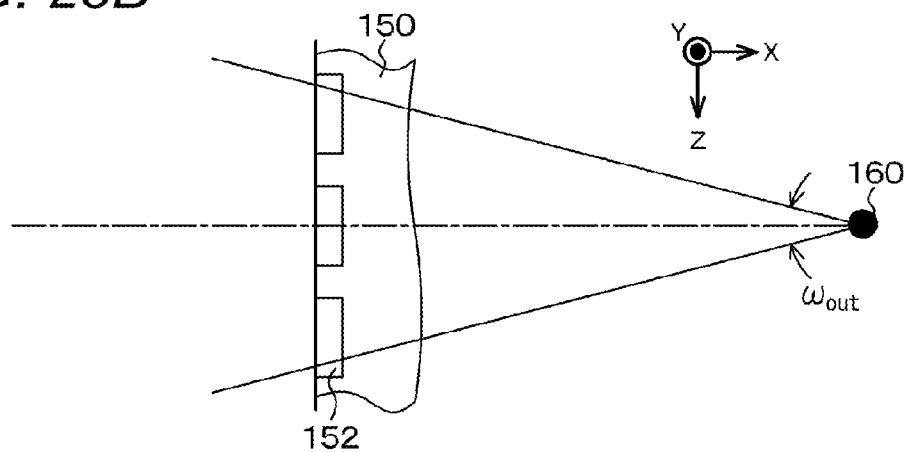
FIG. 23B is a diagram schematically showing a propagation state of light that enters a pixel located at the center of an image generating device of the related art and is emitted from this pixel, as seen from an X-Z plane.

While FIG. 23B schematically shows a propagation state of light that enters a pixel located at the center of an image generating device of the related art and is emitted from this pixel, as seen from the X-Z plane, assuming that an incident solid angle of incident light is the emitting solid angle $\omega_{out}$ shown in FIG. 2A, for example, light that is to enter a certain pixel 152 also enters a pixel adjacent to this certain pixel 152, and as a result, light in an undesired polarization state passes through the adjacent pixel, and a decreased contrast in an image arises. Alternatively, when light from the light source is caused to enter a pixel of the transmissive liquid crystal display device at a large incident solid angle, an angle of a light beam that enters a liquid crystal layer is far different from a right angle, and birefringence occurs, resulting in ovalization of linearly-polarized light or a low extinction ratio in the entire polarizer including an incident-side polarizer and the emitting-side polarizer in combination, and thus a decreased contrast in an image arises.

Example 2

Figure 2C:
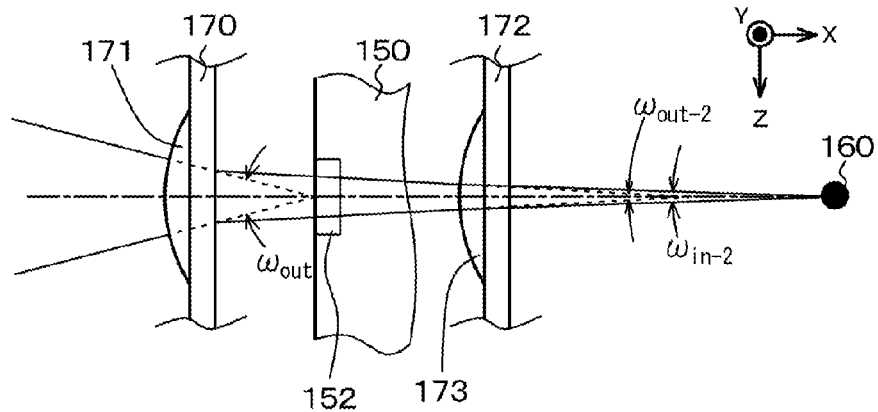
FIG. 2C is a diagram schematically showing a propagation state of light that enters a pixel located at the center of an image generating device of Example 2 and is emitted from this pixel, as seen from an X-Z plane.
Figure 7:
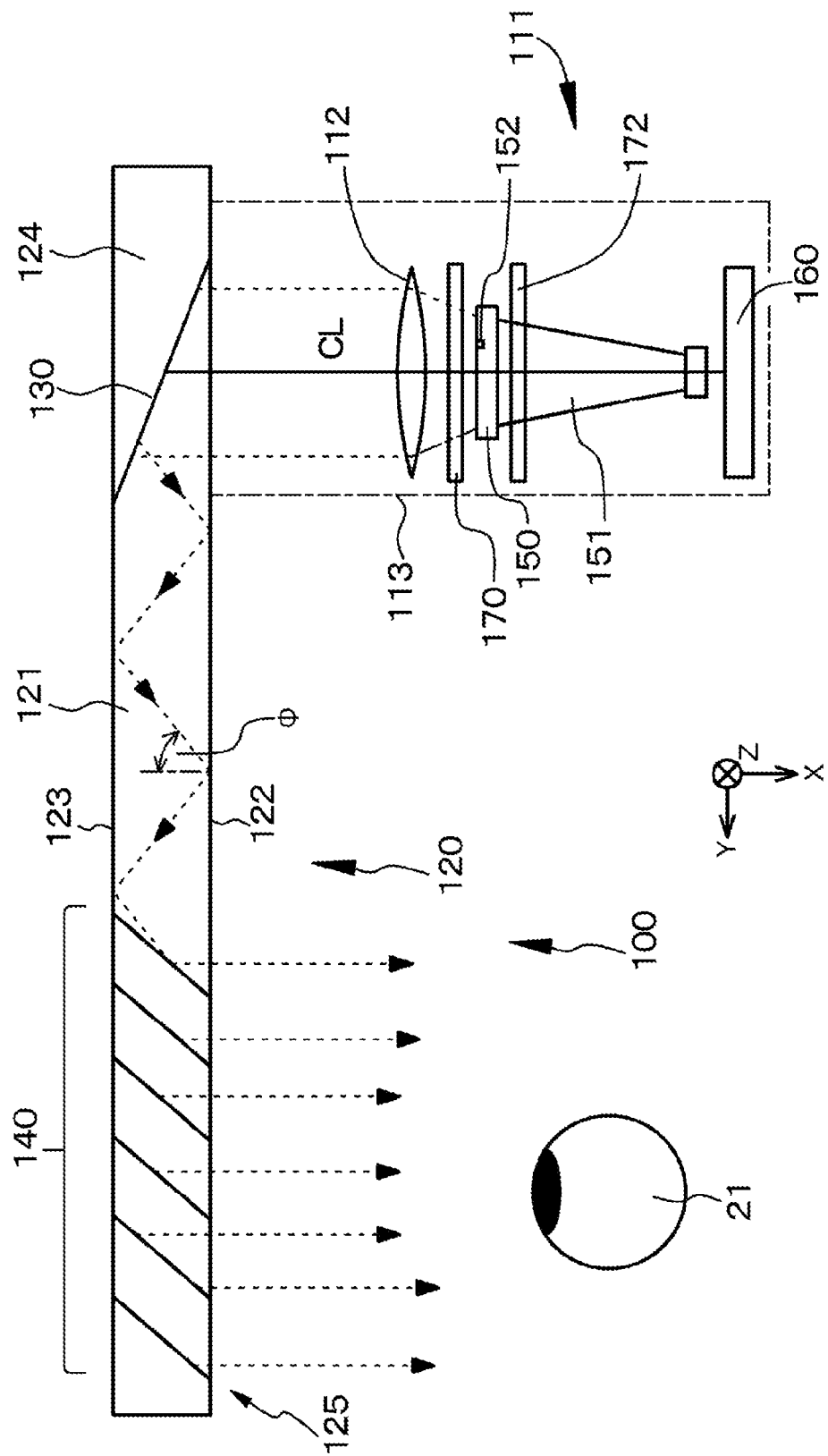
FIG. 7 is a conceptual diagram of an image display apparatus of Example 2.

Example 2 is a modification of Example 1. FIG. 7 shows a conceptual diagram of an image display apparatus of Example 2, and FIG. 2C schematically shows a propagation state of light that enters a pixel located at the center of an image generating device of Example 2 and is emitted from this pixel, as seen from an X-Z plane. A transmissive spatial light modulating device 150 of Example 2 includes, on a light incident side thereof, a second microlens array 172 including a second microlens 173 corresponding to each pixel 152. Then, when an incident solid angle of light that is emitted from a light source 160 and enters the second microlens 173 is assumed to be $\omega_{in\text{-}2}$, and an emitting solid angle (spread angle of light) of light that is emitted from the second microlens 173 is assumed to be $\omega_{out\text{-}2}$, $\omega_{out} > \omega_{in} = \omega_{out\text{-}2} > \omega_{in\text{-}2}$ is satisfied. In other words, the f-number of illumination light that illuminates the second microlens is greater than the f-number of illumination light that illuminates the transmissive spatial light modulating device. Illumination light is gathered onto a pixel of the transmissive spatial light modulating device by the second microlens, and thus loss occurring in illumination light due to collision of the illumination light with a black matrix (a portion that does not transmit light) formed in the transmissive spatial light modulating device can be prevented.

Figure 8:
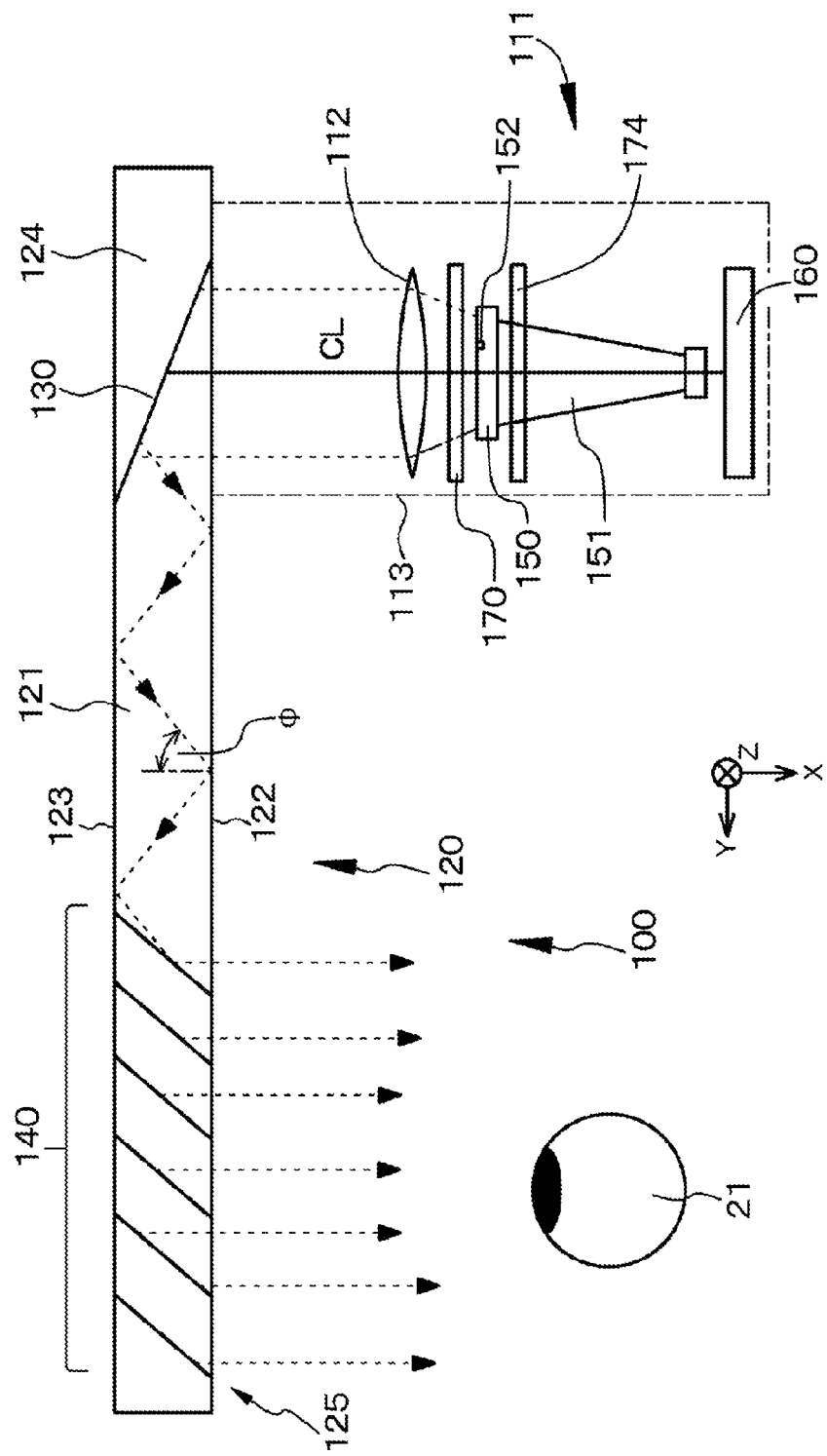
FIG. 8 is a conceptual diagram of a modification of the image display apparatus of Example 2.

Alternatively, as shown in a conceptual diagram of a modification of the image display apparatus of Example 2 in FIG. 8, a mode can also be adopted where the transmissive spatial light modulating device 150 includes a light diffuser panel 174 on the light incident side thereof, A configuration and a structure of the light diffuser panel 174, themselves, can be those of a known light diffuser panel.

Example 3

Figure 9A:
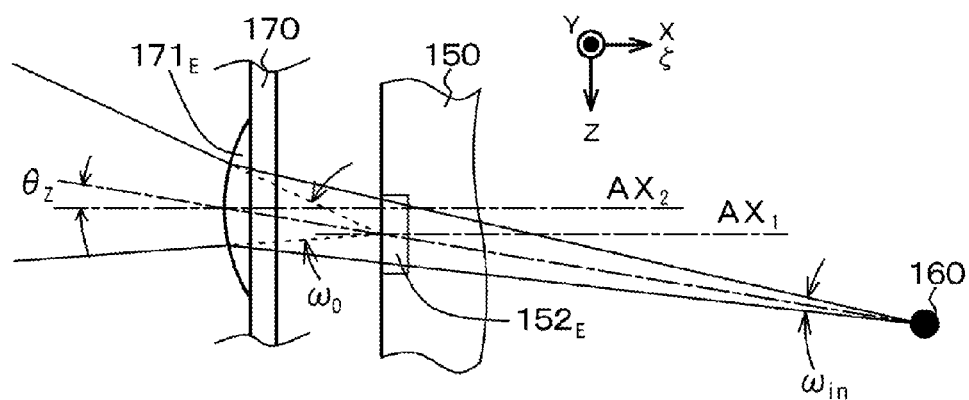
FIG. 9A and FIG. 9B are diagrams schematically showing a propagation state of light that is emitted from a pixel located at the center of an image generating device of Example 3, as seen from an X-Z plane and a propagation state of the light as seen from an X-Y plane.
Figure 9B:
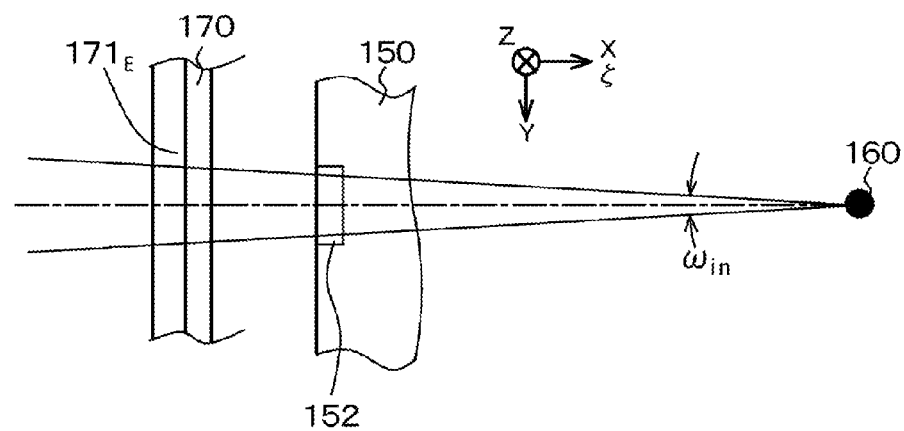
Figure 10A:
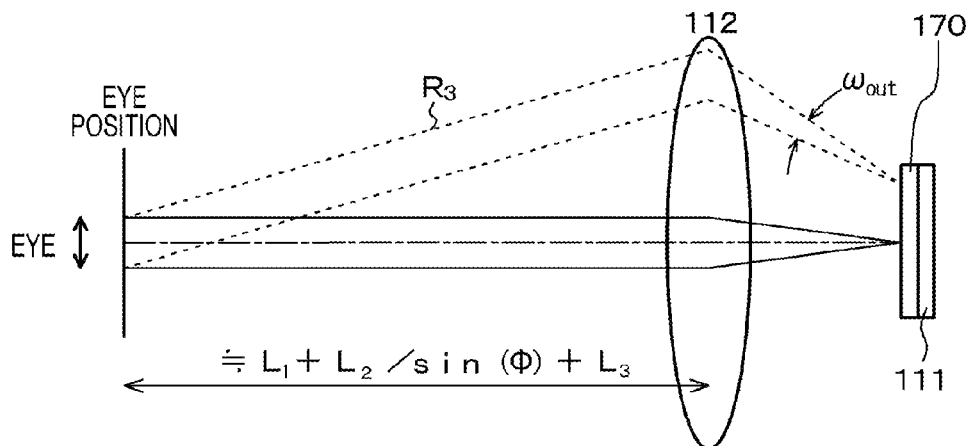
FIG. 10A is a diagram schematically showing a propagation state of light that is emitted from the image generating device of Example 3, is guided by a light guiding unit, and reaches an eye in planes corresponding to an X-Z plane and an X-Y plane.
Figure 10B:
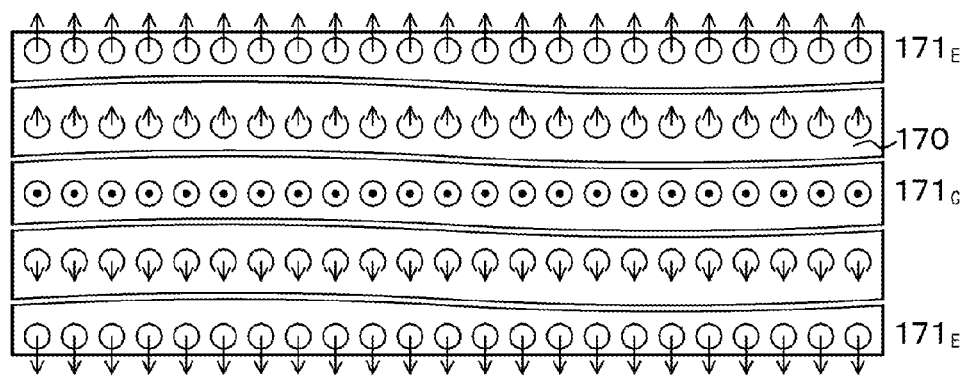
FIG. 10B is a diagram schematically showing light that is emitted from each pixel of the image generating device of Example 3.
Figure 10C:
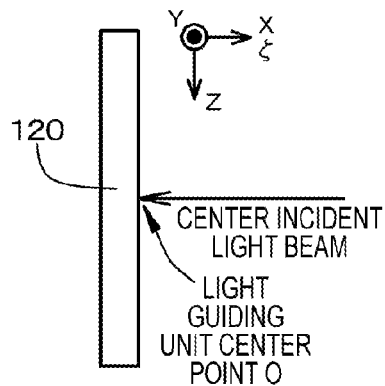
FIG. 10C and FIG. 10D are diagrams of the light guiding unit as seen from aside in order to explain the relationship between the light guiding unit and a center incident light beam in the image generating device of each example.

Example 3 is a modification of Example 1 to Example 2. FIG. 9A and FIG. 9B schematically show a propagation state of light that is emitted from a pixel located at the center of an image generating device of Example 3, as seen from an X-Z plane and a propagation state of the light as seen from an X-Y plane. Furthermore, FIG. 10A schematically shows a propagation state of light that is emitted from the image generating device of Example 3, guided by a light guiding unit, and reaches an eye in planes corresponding to an X-Z plane and the X-Y plane; FIG. 10B schematically shows light that is emitted from each pixel of the image generating device; and FIG. 10C shows a diagram of the light guiding unit as seen from a side in order to explain the relationship between the light guiding unit and a center incident light beam.

In an image generating device 111 of Example 3, a configuration can be adopted where when a point at which light emitted from the center of the image generating device 111 enters a light guiding unit 120, 220, 320 is assumed to be a point O (light guiding unit center point O), a normal in a portion of the light guiding unit 120, 220, 320 passing through the point O is assumed to be an X-axis, an axis line of the light guiding unit 120, 220, 320 in the portion of the light guiding unit 120, 220, 320 passing through the point O is assumed to be a Y-axis, an optical axis of light (center incident light beam CL) that is emitted from the center of the image generating device 111 and enters the light guiding unit 120, 220, 320 at the point O is assumed to be a ζ-axis, and a virtual plane including the ζ-axis and the Y-axis is assumed to be a ζ-Y plane, light that is emitted from the image generating device 111 and enters the light guiding unit 120, 220, 320 at a point $(0, Y_1, Z_1)$ forms a tilt angle $\theta_Z$ with the ζ-Y plane and forms an angle $\theta_1$ with an X-Z plane, and in a case of $Z_1 \neq 0$, $\theta_Z \neq \theta_Y$ is satisfied. In this manner, satisfying $\theta_Z \neq \theta_Y$ in a case of $Z_1 \neq 0$ can result in that occurrence of a phenomenon where when some of light beams emitted from the light guiding unit 120, 220, 320 do not reach an eye 21 and a kind of vignetting arises can be more reliably restrained and that further improvement of the utilization efficiency of light emitted from the image generating device 111 can be realized, and thus a further decrease in power consumption in the image generating device 111 can be realized. Then, in such a configuration, a configuration can be adopted where a value of $\theta_Y$ is constant, regardless of a value of $Y_1$, and as an absolute value of $Z_1$ increases, an absolute value of the tilt angle $\theta_Z$ increases. Here, a mode can be adopted where as the absolute value of $Z_1$ increases, the absolute value of the tilt angle $\theta_Z$ increases monotonically or increases stepwise. When the value of $\theta_Y$ is made constant, regardless of the value of $Y_1$, specifically, but not limited thereto, it is only necessary to be $\theta_Y = 0$, for example. Further, a configuration can be adopted where an amount of deviation of an optical axis of a pixel 152 from an optical axis of a microlens 171 corresponding to this pixel 152 is defined based on a value of (0, $Y_1$, $Z_1$). Alternatively, a configuration can also be adopted where instead of causing the optical axis of a pixel to deviate from the optical axis of the microlens 171 corresponding to this pixel based on the value of (0, $Y_1$, $Z_1$), the optical axis of the microlens 171 is tilted based on the value of (0, $Y_1$, $Z_1$), and in this case, it is only necessary to appropriately design the curvature of a light emitting surface of the microlens 171.

Now, in Example 3, since the ζ-axis coincides with the X-axis, the η-axis coincides with the Y-axis, and a ξ-axis coincides with a Z-axis, the X-Y plane, the X-Z plane, and a Y-Z plane coincide a ζ-η plane, a ζ-ξ plane, and a η-ξ plane, and furthermore the ζ-Y plane coincides with the X-Y plane. Then, light that is emitted from the image generating device 111 and enters the light guiding unit 120, 220, 320 at the point (0, $Y_1$, $Z_1$) forms the tilt angle $\theta_Z$ with the ζ-Y plane (the X-Y plane in the example), and forms the angle $\theta_Y$ with the X-Z plane, and in a case of $Z_1 \neq 0$, $\theta_Z \neq \theta_Y$ is satisfied. When light (center incident light beam CL) that is emitted from the image generating device 111 and enters the light guiding unit 120, 220, 320 at a point (0, 0, 0), when the incident angle (X-Y plane incident angle) at which the light enters on an X-Y plane of a light guiding unit 120, 220, 320 is assumed to be $\theta_{Z0}$, $\theta_{Z0}=0$ degrees (see FIG. 10C). Also, $\theta_Y$ is assumed to be 0 degrees.

Then, in Example 3, the value of $\theta_Y$ is constant, regardless of the value of $Y_1$, and as the absolute value of $Z_1$ increases, the absolute value of the tilt angle $\theta_Z$ increases. A configuration may be adopted where as the absolute value of $Z_1$ increases, the absolute value of the tilt angle $\theta_Z$ increases monotonically, or a configuration may be adopted where the absolute value of the tilt angle $\theta_Z$ increases stepwise. The value of the tilt angle $\theta_Z$ and the amount of deviation described later only need to be optimized by conducting various tests and simulations based on the specifications and designs of the image display apparatus, the image generating devices, and the light guiding unit.

FIG. 9A schematically shows a propagation state of light that is emitted from a pixel $152_E$ located at an upper end of the image generating device 111 of Example 3 (specifically, a transmissive spatial light modulating device 150) and has passed through a corresponding microlens $171_E$, as seen from the X-Z plane, and FIG. 9B schematically shows a propagation state of the light as seen from the X-Y plane. Propagation states of light that is emitted from the pixel 152 located at the center of the image generating device 111 of Example 3 and has passed through the corresponding microlens as seen from the X-Z plane and the X-Y plane are the same as those schematically shown in FIG. 2A and FIG. 2B.

Here, the amount of deviation of an optical axis $AX_1$ of a pixel 152 (a normal that passes through the center of the pixel 152) from an optical axis $AX_2$ of the microlens 171 corresponding to this pixel 152 (a normal that passes through the center of the microlens 171) is defined based on the value of (0, $Y_1$, $Z_1$). In the example shown in FIG. 2A and FIG. 2B, the light is light emitted from the pixel located at the center of the image generating device 111 of Example 3, and hence, (0, $Y_1$, $Z_1$) is (0, $Y_1$, 0), and the amount of deviation of the optical axis $AX_1$ of a pixel 152 from the optical axis $AX_2$ of the microlens 171 corresponding to this pixel 152 is "0". In the example shown in FIG. 9A, on the other hand, the light is light emitted from the pixel $152_E$ located at the upper end of the image generating device 111 of Example 3, and hence, the amount of deviation of the optical axis $AX_1$ of a pixel 152 from the optical axis $AX_2$ of the microlens 171 corresponding to this pixel 152 is maximum. Now, as the value of the tilt angle $\theta_Z$ increases, a distance from a collimator optical system 112 to an eye 21 becomes long, and a decreased contrast in an image normally arises. Hence, it is only necessary to realize optimization of the amount of deviation of the optical axis $AX_1$ of a pixel 152 from the optical axis $AX_2$ of the microlens 171 corresponding to this pixel 152, so as to minimize a decreased contrast in an image even when the distance from the collimator optical system 112 to the eye 21 becomes long. FIG. 10B schematically shows light emitted from each pixel 152 of the image generating device 111, and in FIG. 10B, a circle indicates the pixel 152, and an arrow or a dot depicted in the pixel 152 schematically indicates the direction of light that is emitted from the pixel 152 and has passed through the microlens array 170.

Furthermore, an emitting solid angle (an emission angle, a divergence angle) $\omega_{out}$ of light emitted from the microlens 171 is larger than an incident solid angle $\omega_{in}$ on the pixel 152 (see FIG. 9A). The emitting solid angle (spread angle of light) of light that is emitted from the microlens 171 is an angle at the time of projecting a light beam onto the X-Z plane.

FIG. 10A schematically shows propagation states of light that is emitted from the image generating device 111 of Example 3, guided by the light guiding unit 120, and reaches the eye 21 in planes corresponding to the X-Z plane and the X-Y plane. Now, in this manner, in Example 3, since as the absolute value of $Z_1$ increases, the absolute value of the tilt angle $\theta_Z$ increases, all the light beams (indicated by finely dotted lines $R_3$ in FIG. 10A) that are emitted from the image generating device 111, pass through the microlens array 170 and the parallel light emitting optical system (the collimator optical system 112), and are guided by the light guiding unit 120 can be caused to reach the eye 21. Hence, further improvement of the utilization efficiency of light emitted from the image generating device 111 can be realized, and a further decrease in power consumption in the image generating device 111 can be realized.

Example 4

Example 4 is a modification of the image display apparatuses of Example 1 to Example 3. An image display apparatus of Example 4 includes a light guiding unit of second mode. FIG. 11A shows a conceptual diagram of an image display apparatus 200 of Example 4. Furthermore, FIG. 11B shows a schematic enlarged cross-sectional view of part of a reflective volume hologram diffraction grating. A light guiding unit 220 basically has the same configuration and structure as the light guiding unit 120 of Example 1, except for the configurations and structures of a first deflecting unit and a second deflecting unit.

In Example 4, the first deflecting unit and the second deflecting unit are disposed on a surface of a light guide panel 221 (specifically, a second surface 223 of the light guide panel 221). Then, the first deflecting unit diffracts light that has entered the light guide panel 221, and the second deflecting unit diffracts, more than once, light propagated inside the light guide panel 221 by total reflection. Here, the first deflecting unit and the second deflecting unit are formed with a diffraction grating element, specifically, with a reflective diffraction grating element, more specifically, with a reflective volume hologram diffraction grating. In the description below, the first deflecting unit formed with a reflective volume hologram diffraction grating will be referred to as a "first diffraction grating member 230", and the second deflecting unit formed with a reflective volume hologram diffraction grating will be referred to as a "second diffraction grating member 240", for convenience.

Then, in Example 4, the first diffraction grating member 230 and the second diffraction grating member 240 include a single diffraction grating layer. An interference fringe adapted for one type of wavelength band (or wavelength) is formed in each diffraction grating layer formed with a photopolymer material, and is manufactured by a method of the related art. A pitch of the interference fringes formed in the diffraction grating layer (diffraction optical element) is constant, and the interference fringe is in a linear fashion and extends parallel to a Z-axis. Axis lines of the first diffraction grating member 230 and the second diffraction grating member 240 are parallel to a Y-axis, and normals are parallel to an X-axis.

A configuration can also be adopted where the first diffraction grating member 230 and the second diffraction grating member 240 are formed by stacking P diffraction grating layers formed with a reflective volume hologram diffraction grating, so as to adapt for diffraction and reflection of P types (specifically, P=3: three types of red, green, and blue) of light having different P types of wavelength bands (or wavelengths). An interference fringe adapted for one type of wavelength band (or wavelength) is formed in each diffraction grating layer formed with a photopolymer material, and is manufactured by a method of the related art. More specifically, the first diffraction grating member 230 and the second diffraction grating member 240 each has a structure in which a diffraction grating layer that diffracts and reflects red light, a diffraction grating layer that diffracts and reflects green light, and a diffraction grating layer that diffracts and reflects blue light are stacked one another. The pitch of the interference fringes formed in the diffraction grating layer (diffraction grating element) is constant, and the interference fringe is in a linear fashion and parallel to the Z-axis. In FIG. 11A, the first diffraction grating member 230 and the second diffraction grating member 240 are shown as a single layer. Such a configuration is adopted, so that increased diffraction efficiency, a large diffraction acceptance angle, and an optimized diffraction angle at the time when light having each wavelength band (or wavelength) is diffracted and reflected by the first diffraction grating member 230 and the second diffraction grating member 240 can be realized.

FIG. 11B shows a schematic enlarged cross-sectional view of part of a reflective volume hologram diffraction grating. In the reflective volume hologram diffraction grating, an interference fringe having a tilt angle (slant angle) $\phi$ is formed. Here, the tilt angle (slant angle) $\phi$ indicates an angle formed between a surface of the reflective volume hologram diffraction grating and the interference fringe. The interference fringe is formed to extend from the inside to the surfaces of the reflective volume hologram diffraction grating. The interference fringe satisfies a Bragg's condition. Here, the Bragg's condition refers to a condition that satisfies the following equation (A). In equation (A), m means a positive integer, $\lambda$ means a wavelength, d means a pitch in a grating plane (an interval in the normal direction of a virtual plane including the interference fringe), and $\Theta$ means an angle complementary with an incident angle on the interference fringe. Furthermore, the relationship among $\Theta$, the tilt angle (slant angle) $\phi$, and an incident angle $\psi$ in a case where light enters the diffraction grating member at the incident angle $\psi$ is as equation (B).

$$m \cdot \lambda = 2 \cdot d \cdot \sin(\Theta) \quad (A)$$

$$\Theta = 90° - (\phi + \psi) \quad (B)$$

The first diffraction grating member 230 is disposed on (bonded to) the second surface 223 of the light guide panel 221 as described above, and diffracts and reflects a parallel light beam that has entered the light guide panel 221 so that this parallel light beam that has entered the light guide panel 221 from the first surface 222 is totally reflected inside the light guide panel 221. Further, the second diffraction grating member 240 is disposed on (bonded to) the second surface 223 of the light guide panel 221 as described above, and diffracts and reflects, more than once, the parallel light beam propagated inside the light guide panel 221 by total reflection, and emits the light as a parallel light beam from the first surface 222 of the light guide panel 221. However, the configuration is not limited thereto, and the second surface 223 may constitute an incident surface of the light guide panel and the first surface 222 may constitute an emitting surface of the light guide panel.

Then, also inside the light guide panel 221 a parallel light beam is propagated by total reflection, and is then emitted. Alternatively, parallel light beams of three colors of red, green, and blue are propagated inside by total reflection, and are then emitted. At this time, since the light guide panel 221 is thin, and a light path in which light travels inside the light guide panel 221 is long, the number of times of total reflection until light reaches the second diffraction grating member 240 varies depending on each angle of view (horizontal angle of view). More specifically, among the parallel light beams that enter the light guide panel 221, the number of times of reflection of a parallel light beam that enters at an angle (horizontal angle of view) in a direction toward the second diffraction grating member 240 is fewer than the number of times of reflection of a parallel light beam that enters the light guide panel 221 at an angle in a direction away from the second diffraction grating member 240. This is because a parallel light beam that is diffracted and reflected by the first diffraction grating member 230 and enters the light guide panel 221 at an angle in a direction toward the second diffraction grating member 240 forms a larger angle with a normal of the light guide panel 221 at the time of collision of light propagated inside the light guide panel 221 with an inner surface of the light guide panel 221, compared with a parallel light beam that enters the light guide panel 221 at an angle in the opposite direction thereto. Furthermore, the shape of the interference fringe formed inside the second diffraction grating member 240 and the shape of the interference fringe formed inside the first diffraction grating member 230 are in the symmetrical relationship with respect to an X-Z plane of the light guide panel 221.

Except for the above differences, the image display apparatus and a head mounted display of Example 4 have the same configuration and structure as those of the image display apparatuses and the head mounted displays of Example 1 to Example 3, and therefore, detailed description thereof is omitted.

Example 5

Figure 12A:
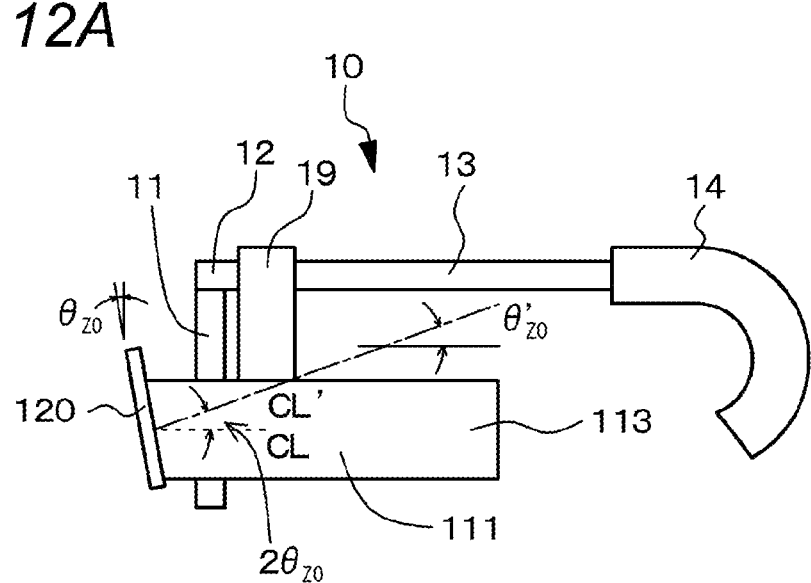
FIG. 12A is a schematic view of an image display apparatus of Example 5 as seen from a side.

Example 5 is a modification of the image display apparatuses in Example 1 to Example 4. FIG. 12A shows a schematic view of an image display apparatus of Example 5 as seen from a side.

In Example 1 to Example 4, in an image display apparatus 100, 200, a design is adopted where a center incident light beam CL that is emitted from the center of an image generating device 111 and has passed through a nodal point of a parallel light emitting optical system 112 on the side of the image generating device enters at an incident angle (X-Y plane incident angle) $\theta_{Z0}$ on an X-Y plane of a light guide panel 121, 221 of 0 degrees. That is, $\theta_{Z0}=0$ degrees (see FIG. 10C).

Figure 24A:
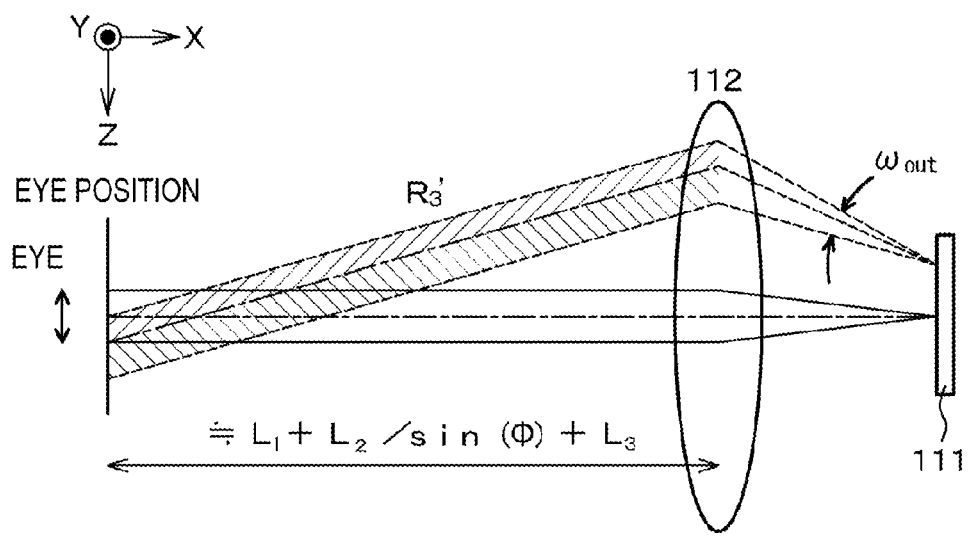
FIG. 24A is a diagram for explaining problems in an image display apparatus of the related art.
Figure 24B:
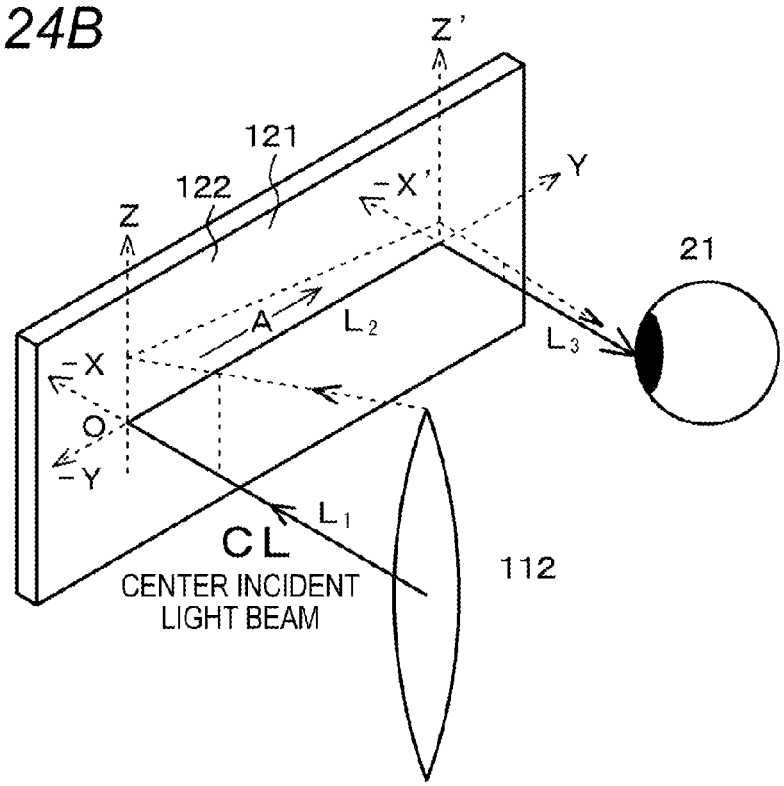
FIG. 24B is a diagram schematically showing a propagation state of light that is emitted from a center portion and an upper end of a collimator optical system, and that is guided by a light guide panel.

That is, in such an image display apparatus represented by the image display apparatus 100, the center incident light beam. CL that is emitted from the center of the image generating device 111 located on an optical axis of the collimator optical system 112 is converted into a substantially parallel light beam by the collimator optical system 112, and then enters a first surface (incident surface) 122 of the light guide panel 121, as shown in FIG. 24B. The center incident light beam CL then travels along a propagation direction A while being totally reflected between the first surface 122 and a second surface 123 by a first deflecting unit 130. Subsequently, this center incident light beam CL is reflected and diffracted by a second deflecting unit 140, is emitted from the first surface 122 of the light guide panel 121 in the X-Y plane, and reaches an eye 21 of a viewer 20.

In an image display apparatus of a see-through type, it is preferable to place the light guiding unit 120, 220 at the lower side of the line of sight of a viewer in the horizontal direction (the horizontal line of sight of a viewer) in order that the light guiding unit 120, 220 will not become disturbance when the viewer 20 sees an observation object located in the horizontal direction. In such a case, the entire image display apparatus 100, 200 is disposed at a lower side of the horizontal line of sight of a viewer. Now, in such a configuration, the entire image display apparatus 100 needs to be tilted at an angle $\theta_{Z0}''$ as shown in a mode of an image display apparatus of the related art in FIG. 12B, and there are cases where the angle $\theta_{Z0}''$ at which the image display apparatus 100 can be tilted is restricted or the degree of freedom in designing becomes lower due to the relationship with an attachment unit (a temple unit) of the eyeglass-type frame to be mounted on the head of a viewer. Hence, it is further desirable to achieve an image display apparatus that can be placed with a high degree of freedom and also has a high degree of freedom in designing, so as not to disturb the horizontal line of sight of a viewer.

Figure 10D:
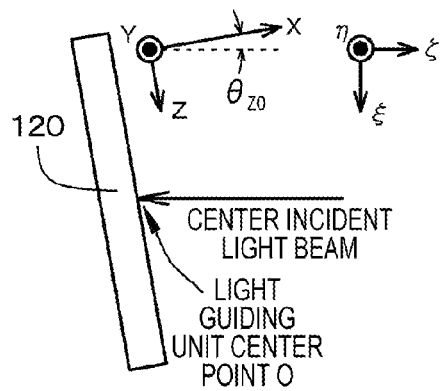

In Example 5, a configuration is adopted where the center incident light beam CL intersects with the X-Y plane at an angle other than 0 degrees ($\theta_{Z0} \neq 0$) (see FIG. 10D and FIG. 12A which are diagrams of the light guiding unit as seen from a side in order to explain the relationship between the light guiding unit and the center incident light beam). The center incident light beam CL is included in an X-Z plane. Furthermore, in Example 5, the angle $\theta_{Z0}$ at which the center incident light beam CL intersects with the X-Y plane is an elevation angle. That is, the center incident light beam CL travels from the lower side of the X-Y plane toward the X-Y plane, and collides with the X-Y plane. Then, the X-Y plane intersects with a vertical plane at an angle other than 0 degrees, specifically, at the angle $\theta_{Z0}$.

In Example 5, $\theta_{Z0}=5$ degrees. That is, the light guiding unit 120, 220 is tilted at the angle $\theta_{Z0}$ with respect to the vertical plane. In other words, the light guiding unit 120, 220 is tilted at an angle of $(90-\theta_{Z0})$ degrees with respect to a horizontal plane. Furthermore, the center incident light beam CL emitted from the light guiding unit 120, 220 is tilted at an angle of $2\theta_{Z0}$ with respect to the horizontal plane. That is, when the viewer 20 sees an object in the horizontal direction, an infinite direction, the center incident light beam CL that is emitted from the light guiding unit 120, 220 and enters the eye 21 of the viewer 20 forms a depression angle $\theta_{Z0}'$ ($=2\theta_{Z0}$). The angle that the center incident light beam CL forms with a normal of the light guiding unit 120, 220 is $\theta_{Z0}$.

In the image display apparatus of Example 5, the center incident light beam CL intersects with the X-Y plane at the angle $\theta_{Z0}$ other than 0 degrees. Here, the center incident light beam CL that is emitted from the light guiding unit 120, 220 and enters the eye 21 of the viewer 20 forms the depression angle $\theta_{Z0}'$, which has the following relationship:

$$\theta_{Z0}'=2\theta_{Z0}.$$

Figure 12B:
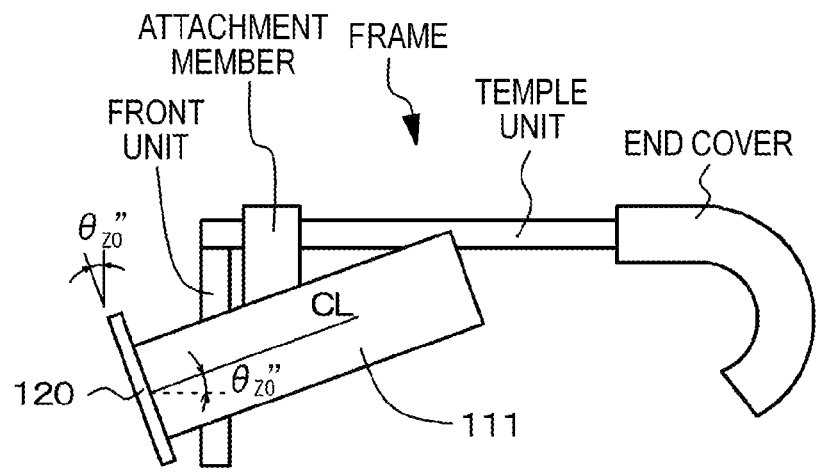
FIG. 12B is a schematic view of one mode of an image display apparatus of the related art as seen from a side.

Meanwhile, in the example shown in FIG. 12B, for obtaining the same depression angle, it is necessary to title the entire image display apparatus at the angle $\theta_{Z0}''$, here, the relationship between $\theta_{Z0}''$ and $\theta_{Z0}$ is $$\theta_{Z0}''=2\theta_{Z0},$$

and eventually, in the example shown in FIG. 12B, the light guiding unit has to be tilted at $2\theta_{Z0}$ with respect to the vertical plane. In Example 5, on the other hand, the light guiding unit only needs to be tilted at the angle $\theta_{Z0}$ with respect to the vertical plane, and it is only necessary to hold the image generating device horizontally. Accordingly, there are fewer restrictions on the mounting angle of the image display apparatus at the time of attaching the image display apparatus to the attachment unit of the eyeglass-type frame, and a high degree of freedom in designing can be obtained. Furthermore, since a tilt of the light guiding unit with respect to the vertical plane is smaller than that in the example shown in FIG. 12B, such a phenomenon that external light is reflected by the light guiding unit and enters the eye 21 of the viewer 20 is difficult to arise. Hence, an image with higher quality can be displayed.

Except for the above differences, the image display apparatus of Example 5 has the same configuration and structure as those of image display apparatuses of Example 1 to Example 4, and therefore, detailed description thereof is omitted.

Example 6

Figure 13:
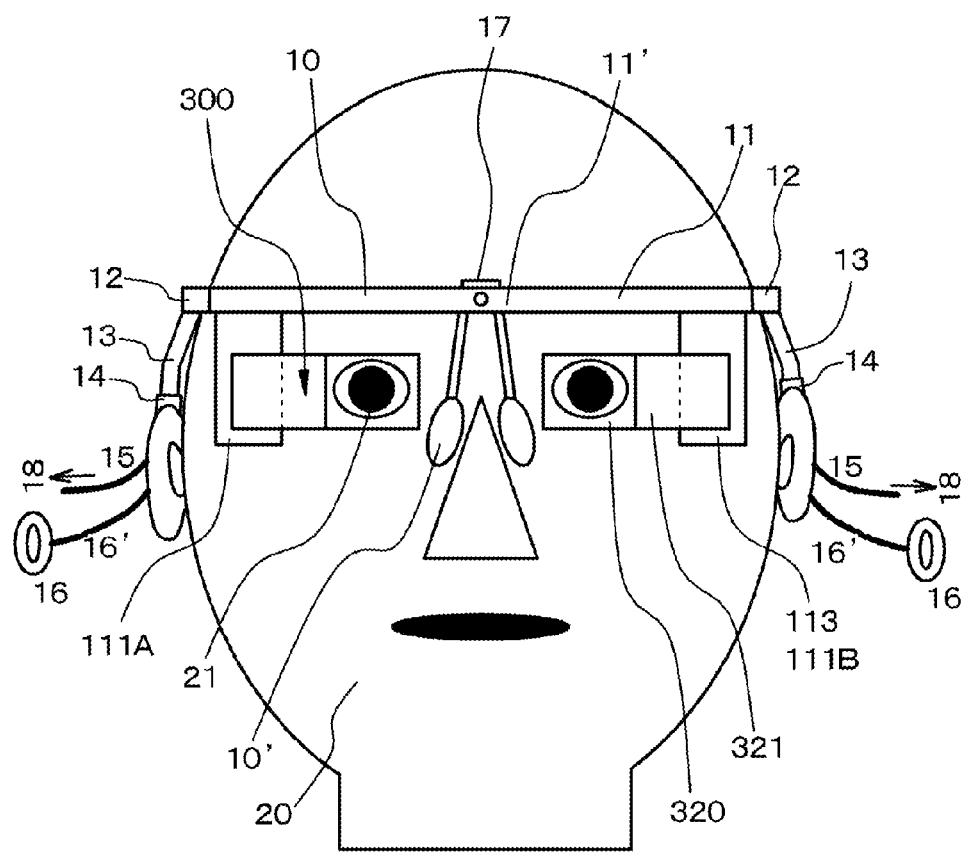
FIG. 13 is a schematic view of an image display apparatus of Example 6 as seen from the front.
Figure 14:
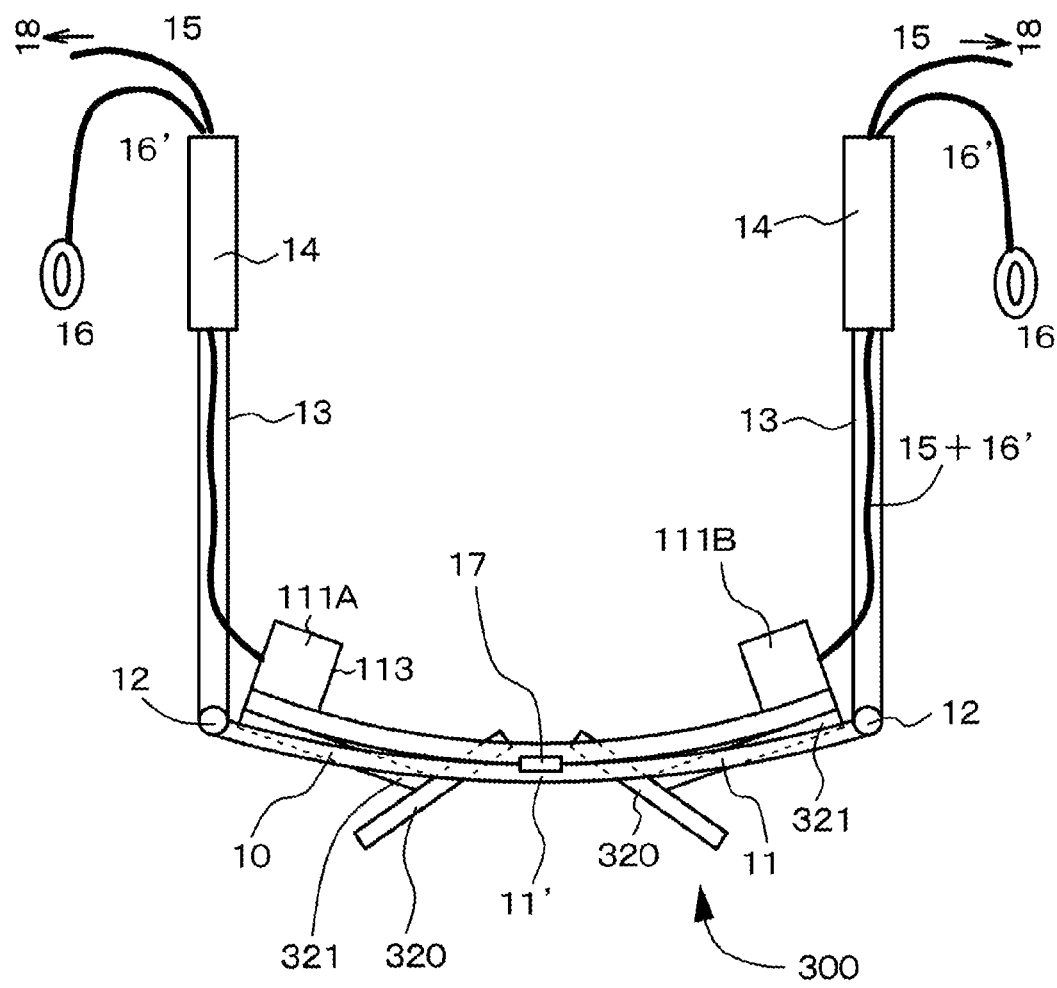
FIG. 14 is a schematic view of the image display apparatus of Example 6 as seen from above.

Example 6 is also a modification of the image display apparatuses in Example 1 to Example 4. FIG. 13 shows a schematic view of an image display apparatus of Example 6 as seen from the front, and FIG. 14 shows a schematic view of the image display apparatus as seen from above.

In Example 6, a structure is adopted where a light guiding unit 320 includes a semi-transmissive mirror that receives light emitted from an image generating device 111A, 111B, and emits the light toward an eye 21 of a viewer 20. It is to be noted that in Example 6, light emitted from the image generating device 111A, 111B propagates inside a transparent member 321 such as a glass panel and a plastic panel, and enters the light guiding unit 320 (semi-transmissive mirror); however, a structure may also be adopted where the light propagates through the air, and enters the light guiding unit 320.

Each image generating device 111A, 111B is attached to a front unit 11 with a screw, for example. Furthermore, a member 321 is attached to each image generating device 111A, 111B, and the light guiding unit 320 (semi-transmissive mirror) is attached to the member 321. Except for the above differences, the image display apparatus of Example 6 has substantially the same configuration and structure as those of image display apparatuses of Example 1 to Example 4, and therefore, detailed description thereof is omitted.

Example 7

Figure 15:
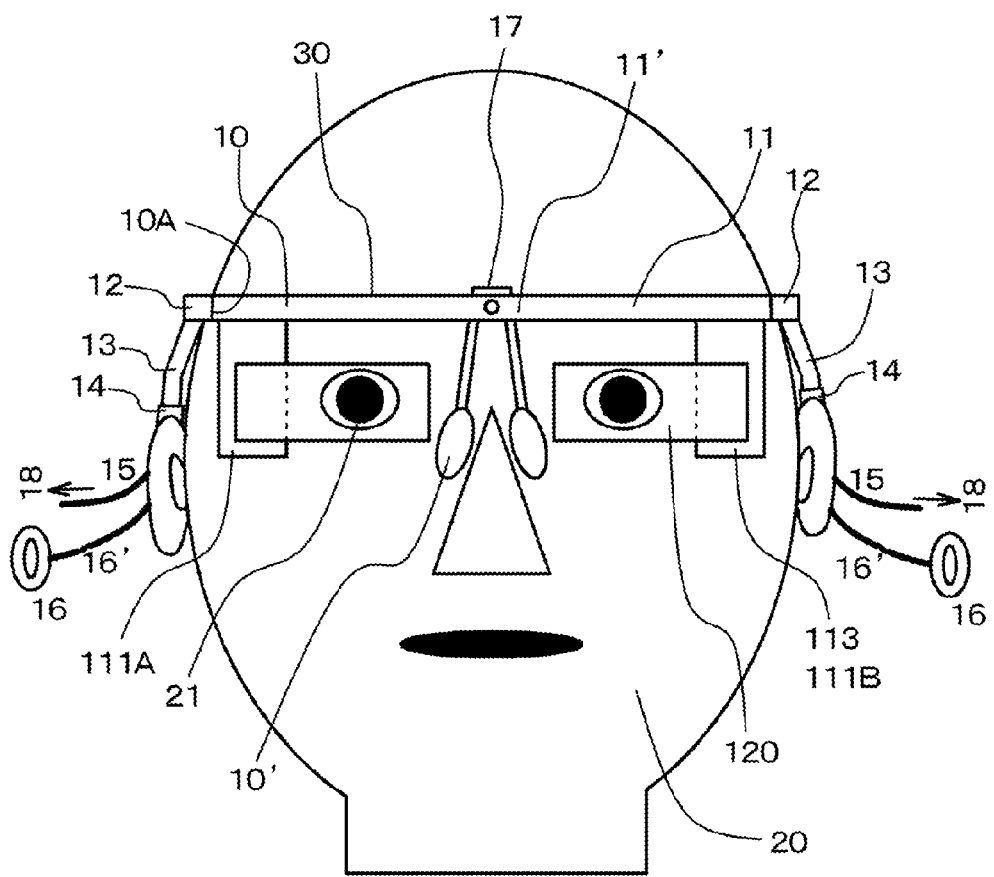
FIG. 15 is a schematic view of a head mounted display of Example 7 as seen from the front.
Figure 16:
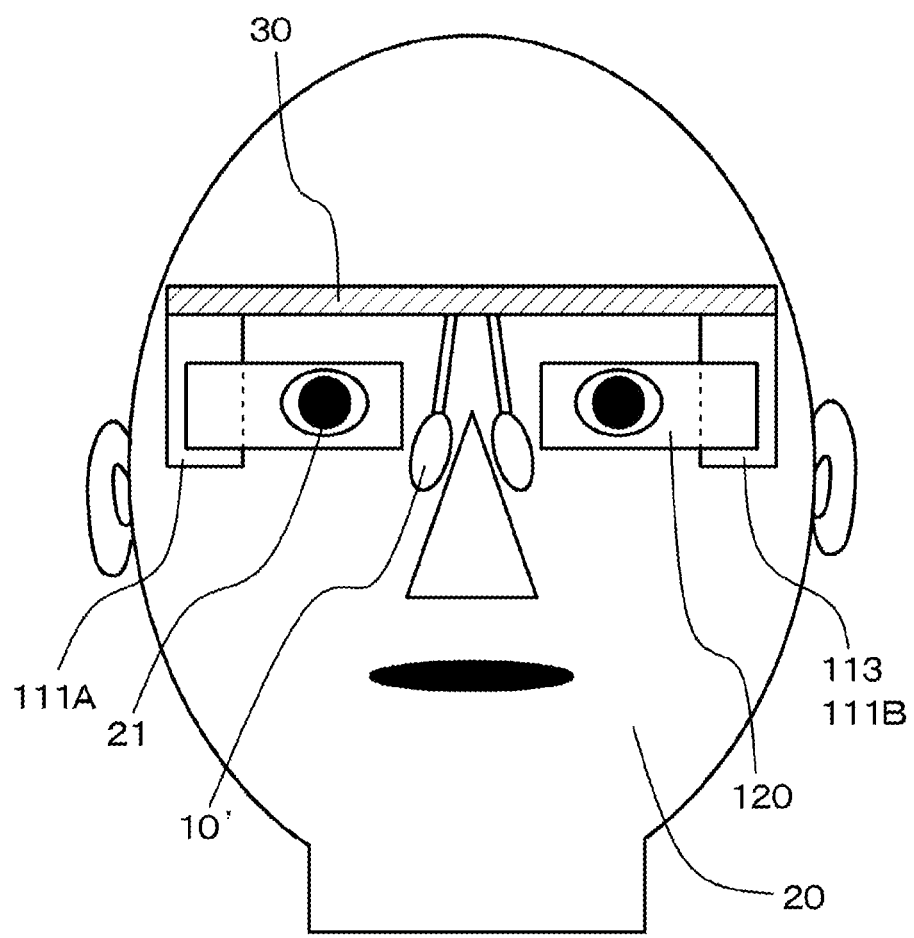
FIG. 16 is a schematic view of the head mounted display of Example 7 (however, a state on the supposition that a frame is removed) as seen from the front.
Figure 17:
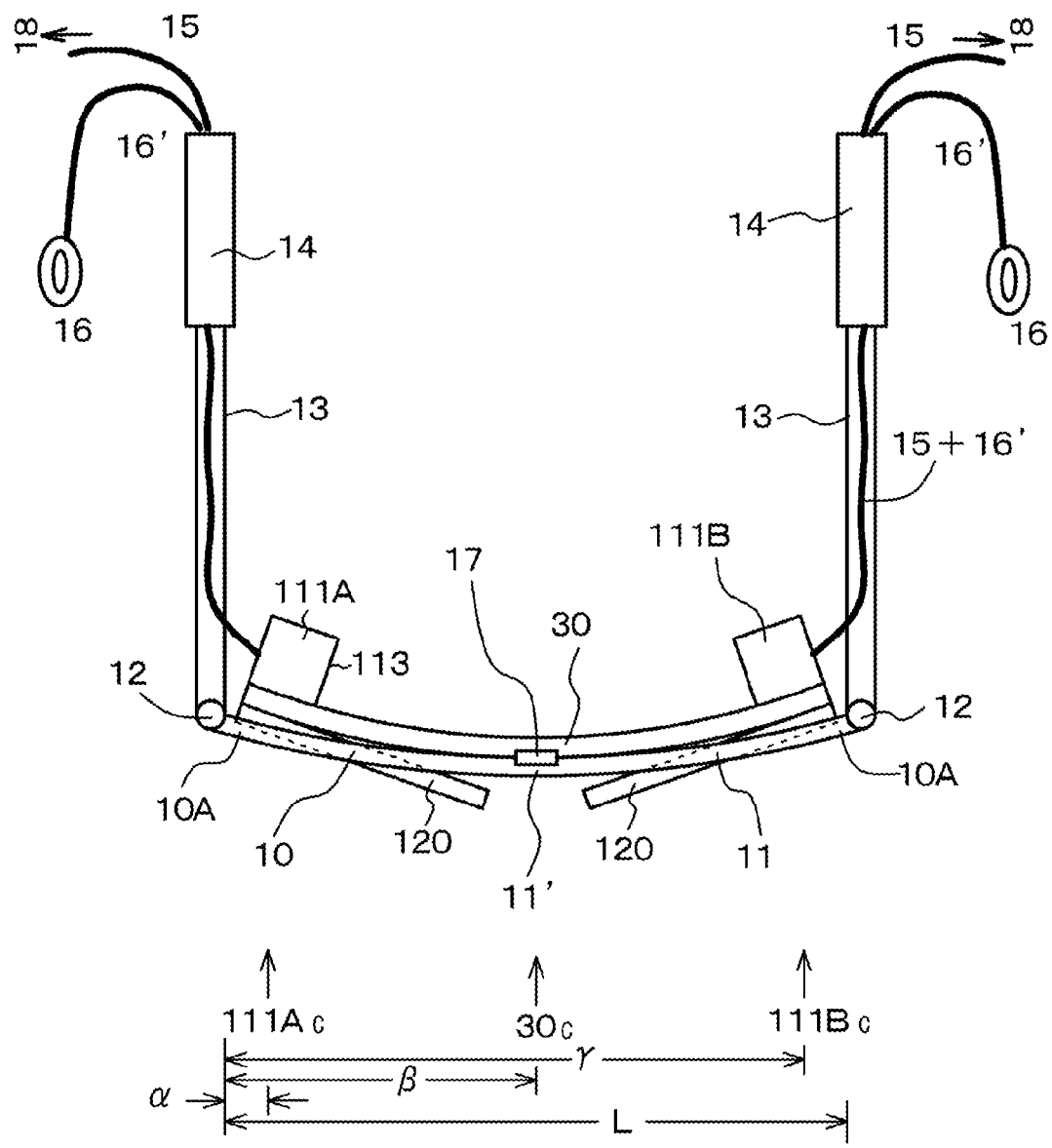
FIG. 17 is a schematic view of the head mounted display of Example 7 as seen from above.

Example 7 relates to an image display apparatus of the present disclosure, specifically, a head mounted display into which an image display apparatus 100, 200, 300 described in Example 1 to Example 6 is incorporated. FIG. 15 shows a schematic view of the head mounted display of Example 7 as seen from the front, and FIG. 16 shows a schematic view of the head mounted display of Example 7 (however, a state on the supposition that a frame is removed) as seen from the front. Furthermore, FIG. 17 shows a schematic view of the head mounted display of Example 7 as seen from above. In the description below, the image display apparatus is described based on the image display apparatus 100, but needless to say, the image display apparatus 200, 300 can be applied.

The head mounted display of Example 7 includes:

(A) an eyeglass-type frame 10 to be mounted on the head of a viewer 20; and (B) two image display apparatuses 100. The head mounted display in Example 7 or in Example 8 to be described later is also made as a binocular type including the two image display apparatuses 100.

Figure 20:
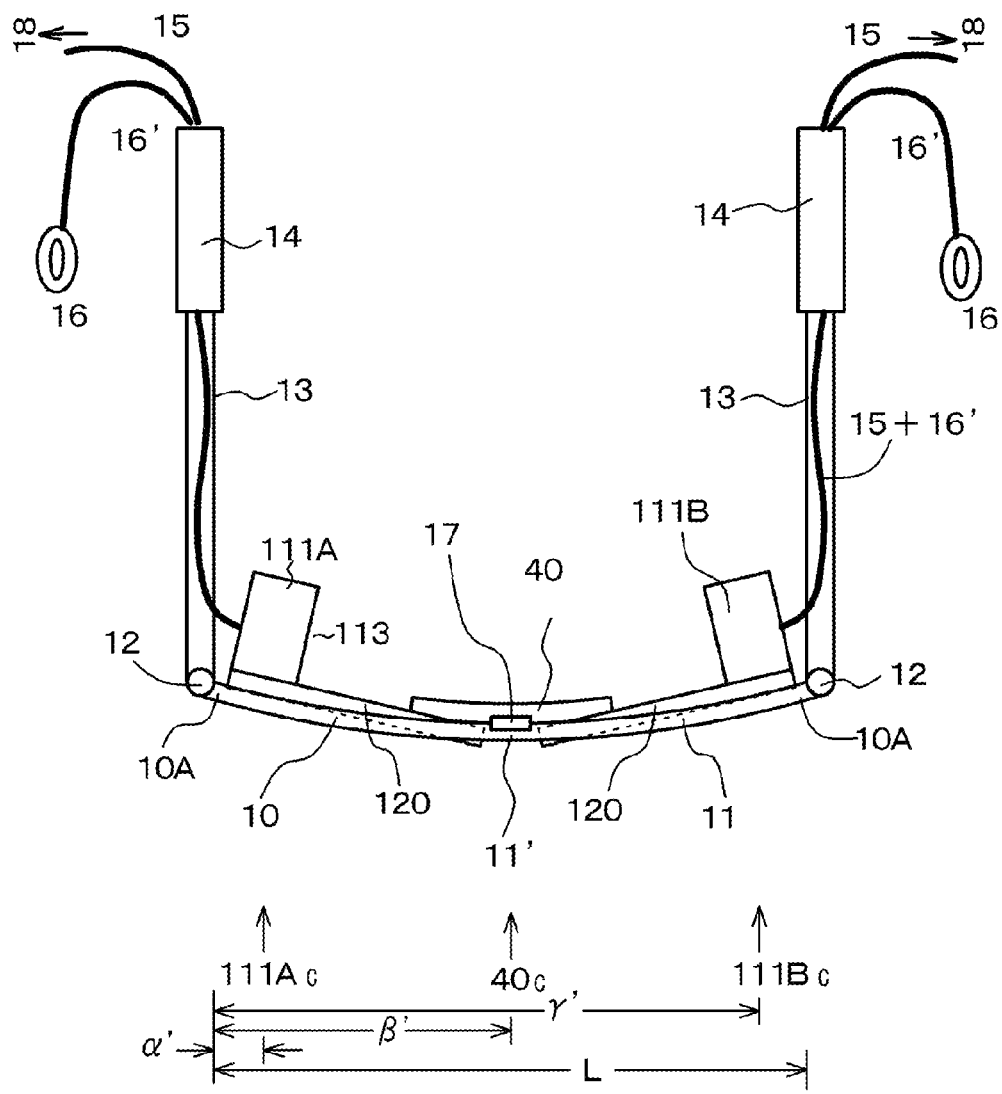
FIG. 20 is a schematic view of the head mounted display of Example 8 as seen from above.
Figure 21:
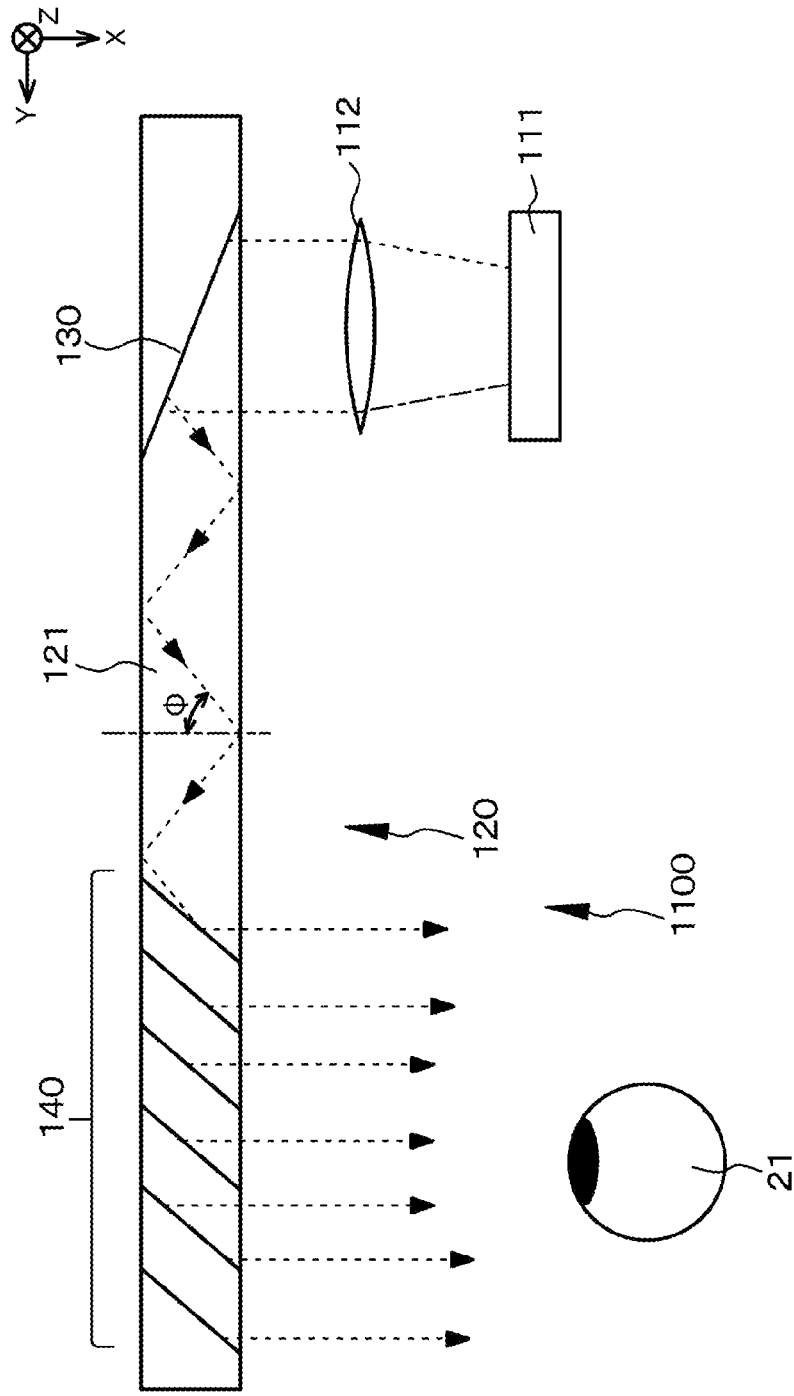
FIG. 21 is a conceptual diagram of an image display apparatus of the related art.
Figure 22:
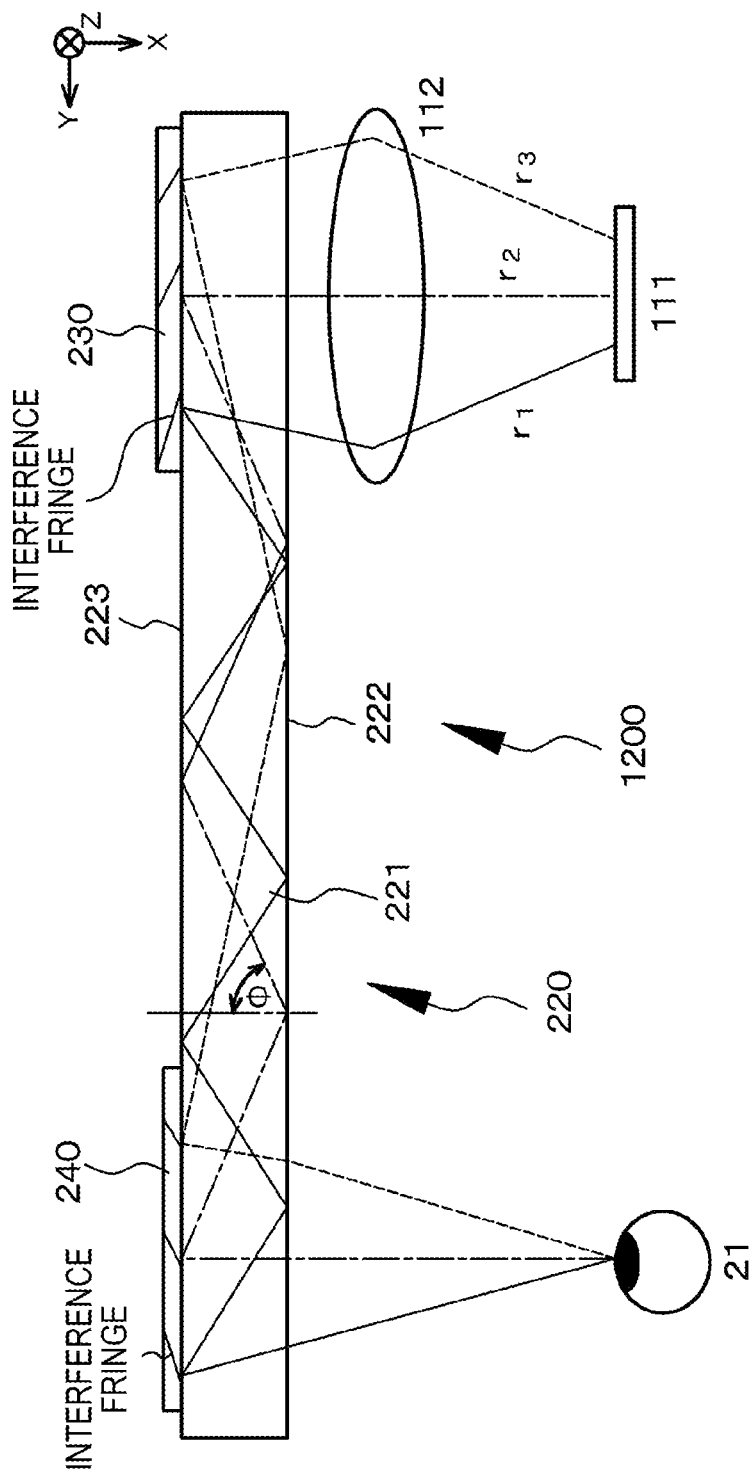
FIG. 22 is a conceptual diagram of an image display apparatus of the related art in a different form from that shown in FIG. 21.

Then, the head mounted display of Example 7 further includes a joining member 30 that joins the two image display apparatuses 100. The joining member 30 is attached to the side facing a viewer (that is, between the viewer 20 and the frame 10) of a center portion 11' (equivalent to a bridge portion of regular glasses) of a front unit 11 of the frame 10 located between two eyes 21 of the viewer 20, with the use of a screw (not shown), for example. A nose pad 10' is also attached to the side facing the viewer 20 of the joining member 30. In FIG. 17 and FIG. 20, the nose pad 10' is not shown. The frame 10 and the joining member 30 are manufactured from a metal or plastic, and the shape of the joining member 30 is the shape of a curved stick.

A projected image of the joining member 30 is included in a projected image of the frame 10. That is, when the head mounted display is seen from the front of the viewer 20, the joining member 30 is hidden by the frame 10, and the joining member 30 is not visually recognized. Further, the two image display apparatuses 100 are joined by the joining member 30, specifically, the image generating device 111A, 111B is housed in a housing 113, and the housing 113 is attached to each end of the joining member 30 in such a manner that an attachment state is adjustable. Then, each image generating device 111A, 111B is located on the outer side of the eye 21 of the viewer 20. Specifically, when a distance between the attachment unit center $111A_C$ of the one image generating device 111A and one end (one of endpieces) 10A of the frame 10 is assumed to be α, a distance from the center $30_C$ of the joining member 30 to the one end (one of the endpieces) 10A of the frame is assumed to be β, a distance between the attachment unit center $111B_C$ of the other image generating device 111B and the one end (one of the endpieces) 10A of the frame is assumed to be γ, and the length of the frame is assumed to be L,

α=0.1×L,

β=0.5×L,

γ=0.9×L.

The image generating device (specifically, the image generating device 111A, 111B) is attached to each end of the joining member 30, specifically, by providing three through holes (not shown) in each end of the joining member, providing hole portions (screw portions, not shown) with taps corresponding to the through holes in the image generating device 111A, 111B, passing screws (not shown) through the respective through holes, and screwing the screws to the hole portions provided in the image generating device 111A, 111B. A spring is inserted in advance between each screw and each hole portion. In this manner, the attachment state of the image generating device (a tilt of the image generating device with respect to the joining member) can be adjusted by fastened states of the screws. After the attachment, the screws are hidden by a cover (not shown). It is to be noted that in FIG. 16 and FIG. 19, the joining member, 30, 40 is marked with an oblique line, so as to clearly show the joining member 30, 40.

In this manner, in the head mounted display (HMD) of Example 7, the joining member 30 joins the two image display apparatuses 100, and this joining member 30 is attached to the center portion 11' of the frame 10 located between the two eyes 21 of the viewer 20. That is, each image display apparatus 100 does not have a structure of being attached directly to the frame 10. Accordingly, when the viewer 20 wears the frame 10 on the head, a temple unit 13 becomes in a state of spreading toward the outer side, and as a result, even when the frame 10 is deformed, displacement (a change in position) of the image generating device 111A, 111B due to such deformation of the frame 10 does not arise, or if arises, extremely small displacement. Hence, a change in the angle of convergence of right and left images can be reliably prevented. Furthermore, since there is no need to increase the rigidity of the front unit 11 of the frame 10, an increased weight of the frame 10, low designability, and an increased cost are not brought about. Also, since the image display apparatus 100 is not attached directly to the eyeglass-type frame 10, it is possible to freely select the design, the color and the like of the frame 10 according to a viewer's preference, and also there are fewer restrictions on the design of the frame 10 and a high degree of freedom in designing. In addition, when the head mounted display is seen from the front of the viewer, the joining member 30 is hidden by the frame 10. Accordingly, high designablity, design characteristics, can be given to the head mounted display.

Example 8

Figure 18:
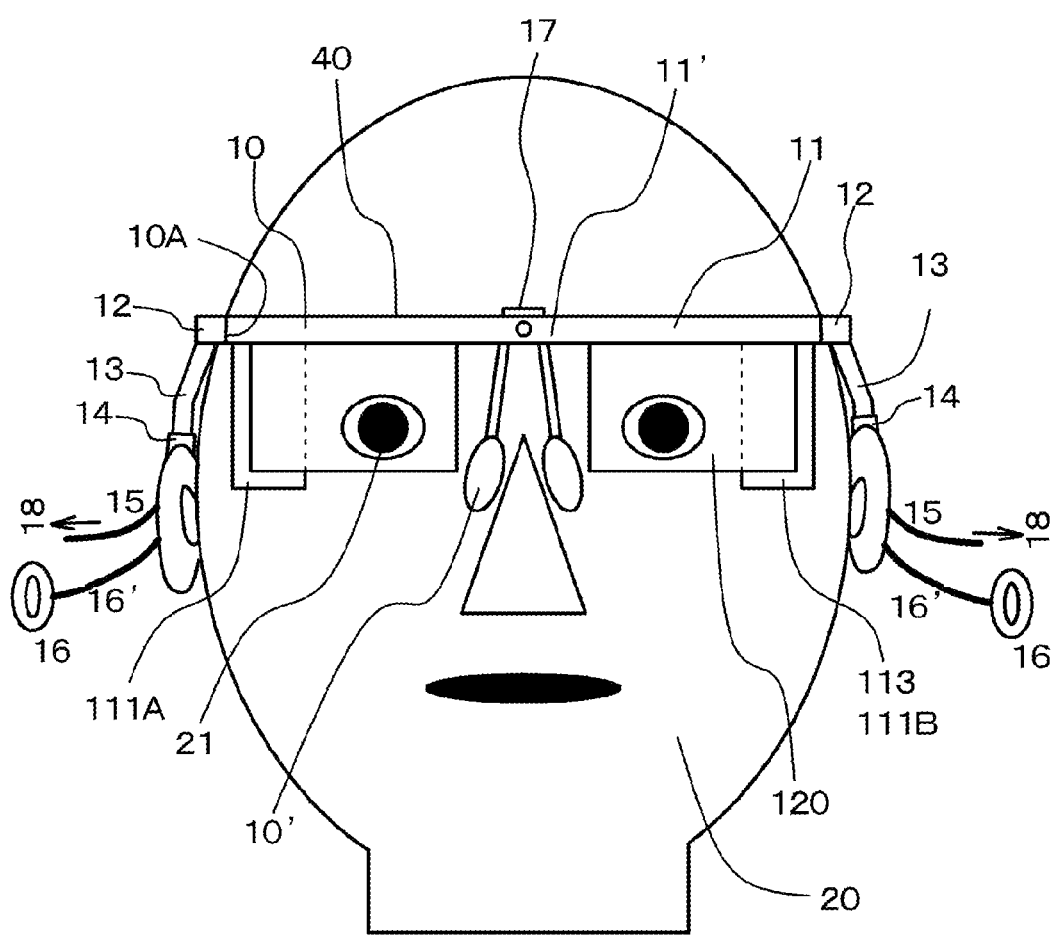
FIG. 18 is a schematic view of a head mounted display of Example 8 as seen from the front.
Figure 19:
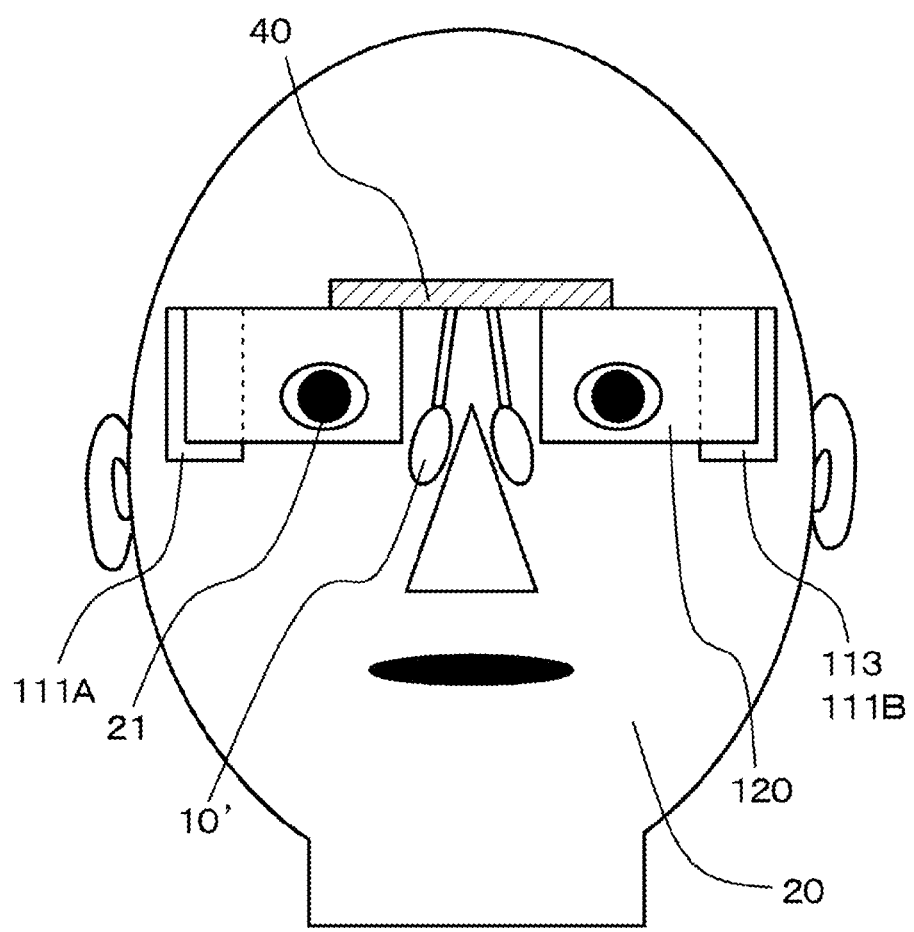
FIG. 19 is a schematic view of the head mounted display of Example 8 (however, a state on the supposition that a frame is removed) as seen from the front.

Example 8 is a modification of Example 7. FIG. 18 shows a schematic view of a head mounted display of Example 8 as seen from the front, and FIG. 19 shows a schematic view of the head mounted display of Example 8 (however, a state on the supposition that a frame is removed) as seen from the front. Furthermore, FIG. 20 shows a schematic view of the head mounted display of Example 8 as seen from above.

In the head mounted display of Example 8, unlike in Example 7, a joining member 40 in the shape of a stick joins two light guiding units 120, instead of joining two image generating devices 111A, 111B. It is to be noted that a mode can also be adopted where the two light guiding units 120 are integrally manufactured, and a joining member 40 is attached to the light guiding units 120 integrally manufactured.

Here, in the head mounted display of Example 8, the joining member 40 is also attached to a center portion 11' of a frame 10 located between two eyes 21 of a viewer 20 with the use of a screw, for example, and each image generating device 111 is located on the outer side of the eye 21 of the viewer 20. Each image generating device 111 is attached to an end of the light guiding unit 120. When a distance from the center $40_C$ of the joining member 40 to one end of the frame 10 is assumed to be β, and the length of the frame 10 is assumed to be L, β=0.5×L is satisfied. In Example 8, a value of α' and a value of γ' are also the same as the value of α and the value of γ of Example 7.

In Example 8, the frame 10 and each image display apparatus have the same configurations and structures as those of the frame 10 and the image display apparatus described in Example 7. Hence, detailed description thereof is omitted. Furthermore, since except for the above differences, the head mounted display of Example 8 also has the same configuration and structure as those of the head mounted display of Example 7, detailed description thereof is omitted.

As above, although the present disclosure has been described based on preferred embodiments, the present disclosure is not limited to those embodiments. The configurations and the structures of the image display apparatus and the image generating device described in the embodiments are illustrative, and can be modified where appropriate. Although in the embodiments, the two deflecting units are disposed in the one light guide panel, the one deflecting unit for emitting light from a light guide panel may be disposed in the one light guide panel, and in this case, it is only necessary to cause light to enter an end surface of the light guide panel. Furthermore, although in the embodiments, the microlens array is disposed on the light emitting side of the transmissive spatial light modulating device, being adjacent to the transmissive spatial light modulating device, the microlens array may be disposed in contact with the transmissive spatial light modulating device, or may be disposed integrally with the transmissive spatial light modulating device and located inside the transmissive spatial light modulating device. In the latter case, the microlens can be formed by forming a concave portion in an inner surface of a transparent substrate (a transparent substrate on the emitting side) constituting the transmissive spatial light modulating device, and filling this concave portion with a transparent material having a different refractive index from a refractive index of a material constituting the transparent substrate. Alternatively, the microlens can also be formed by forming a concave portion in a planarizing layer located between a transparent substrate (a transparent substrate on the emitting side) constituting the transmissive liquid crystal display device and a liquid crystal layer, and filling this concave portion with a transparent material having a different refractive index from a refractive index of a material constituting the planarizing layer. The same can apply to the second microlens, except that the transparent substrate on the emitting side is replaced with a transparent substrate on the incident side.

Although in Example 3, the Y-direction is almost the horizontal direction with respect to the viewer, depending on a placement state of the image display apparatus, the image generating device, and the light guiding unit, the Y-direction may be almost the vertical direction with respect to the viewer. Also, the angle $θ_Y$ may be an angle other than 0 degrees, and in this case, it is preferable that light that enters the light guiding unit at the point $(0, Y_1, Z_1)$ travel in the opposite direction to the light guiding direction in the light guiding unit and enter the light guiding unit, that is, the light that enters the light guiding unit at the point $(0, Y_1, Z_1)$ form an acute angle as a whole with the light guiding direction in the light guiding unit, in other words, an angle formed between a projected image on the X-Y plane of the light entering the light guiding unit at the point $(0, Y_1, Z_1)$ and the Y-axis be an acute angle.

Furthermore, for example, a surface-relief hologram (see US 2004/0062505 A1) may be placed on the light guide panel. Furthermore, in the light guiding unit of Example 4, a configuration can also be adopted where a first deflecting unit formed with a transmissive hologram is disposed on the first surface 232 of the light guide panel 221, and a second deflecting unit formed with a reflective hologram is disposed on the second surface 223. In such a configuration, light that enters the first deflecting unit is diffracted, satisfies the total reflection condition in the light guide panel, and propagates to reach the second deflecting unit. The light is then diffracted and reflected by the second deflecting unit, and is emitted from the light guide panel. Also, in the light guiding unit of Example 4, the diffraction grating element can include a transmissive diffraction grating element, or a mode can also be adopted where any one of the first deflecting unit and the second deflecting unit include a reflective diffraction grating element while the other one includes a transmissive diffraction grating element. Alternatively, the diffraction grating element can be a reflective blazed diffraction grating element or a surface-relief hologram. Although the binocular type including the two image display apparatuses has only been described above in the embodiments, a monocular type including the one image display apparatus may be adopted.

It is to be noted that the present disclosure can also have the configurations described below.

[1] <Image display apparatus>

An image display apparatus including:

(A) an image generating device including a light source and a transmissive spatial light modulating device formed with pixels arranged in a two-dimensional matrix; and (B) a light guiding unit that guides light from the image generating device and emits the light toward an eye of a viewer, wherein the transmissive spatial light modulating device includes, on a light emitting side thereof, a microlens array including a microlens corresponding to each pixel, and when an incident solid angle of light entering a pixel from the light source is assumed to be $ω_{in}$, and an emitting solid angle of light that passes through the pixel and is emitted from the microlens corresponding to the pixel is assumed to be $ω_{out}$, $ω_{out} > ω_{in}$ is satisfied.

[2] The image display apparatus according to [1], wherein the transmissive spatial light modulating device includes, on a light incident side thereof, a second microlens array including a second microlens corresponding to each pixel, and when an incident solid angle of light entering the second microlens from the light source is assumed to be $ω_{in-2}$, and $ω_{out-2}$ represents an emitting solid angle of light emitted from the second microlens is assumed to be $ω_{out-2}$, $ω_{out} > ω_{in} = ω_{out-2} > ω_{in-2}$ is satisfied.

[3] The image display apparatus according to [1], wherein the transmissive spatial light modulating device includes a light diffuser panel on the light incident side thereof.

[4] The image display apparatus according to any one of [1] to [3], wherein the image generating device further includes a light pipe, and light emitted from the light source enters the transmissive spatial light modulating device via the light pipe.

[5] The image display apparatus according to any one of [1] to [4], wherein when a point at which light emitted from the center of the image generating device enters the light guiding unit is assumed to be a point O, a normal in a portion of the light guiding unit passing through the point O is assumed to be an X-axis, an axis line of the light guiding unit in the portion of the light guiding unit passing through the point O is assumed to be a Y-axis, an optical axis of the light that is emitted from the center of the image generating device and enters the light guiding unit at the point O is assumed to be a ζ-axis, and a virtual plane including the ζ-axis and the Y-axis is assumed to be a ζ-Y plane, light that is emitted from the image generating device and enters the light guiding unit at a point $(0, Y_1, Z_1)$ forms an angle (tilt angle) $\theta_Z$ with the ζ-Y plane and forms an angle $\theta_Y$ with an X-Z plane, and in a case of $Z_1 \neq 0$, $\theta_Z \neq \theta_Y$ is satisfied.

[6] The image display apparatus according to [5], wherein
a value of $\theta_Y$ is constant, regardless of a value of $Y_1$, and,
as an absolute value of $Z_1$ increases, an absolute value of $\theta_Z$ increases.

[7] The image display apparatus according to [6], wherein, as the absolute value of $Z_1$ increases, the absolute value of $\theta_Z$ increases monotonically or increases stepwise.

[8] The image display apparatus according to [6] or [7], wherein an amount of deviation of an optical axis of a pixel from an optical axis of the microlens corresponding to the pixel is defined based on a value of $(0, Y_1, Z_1)$.

[9] The image display apparatus according to any one of [1] to [8], wherein the microlens array is formed with a cylindrical lens array or an anamorphic lens array.

[10] The image display apparatus according to any one of [1] to [9], wherein the light guiding unit includes:

(B-1) a light guide panel that propagates incident light therein by total reflection, and then emits the light;

(B-2) a first deflecting unit that deflects light that has entered the light guide panel so that the light that has entered the light guide panel is totally reflected inside the light guide panel; and (B-3) a second deflecting unit that deflects, more than once, the light propagated inside the light guide panel by total reflection so that the light propagated inside the light guide panel by total reflection is emitted from the light guide panel.

[11] The image display apparatus according to any one of [1] to [10], wherein the transmissive spatial light modulating device is formed with a transmissive liquid crystal display device.

[12] <Image generating device>

An image generating device that propagates incident light therein by total reflection, and then emits the light toward a light guiding unit including a light guide panel emitting light with a deflecting unit, the image generating device including a light source and a transmissive spatial light modulating device formed with pixels arranged in a two-dimensional matrix, wherein the transmissive spatial light modulating device includes, on a light emitting side thereof, a microlens array including a microlens corresponding to each pixel, and when an incident solid angle of light entering a pixel from the light source is assumed to be $\omega_{in}$, and an emitting solid angle of light that passes through the pixel and is emitted from the microlens corresponding to the pixel is assumed to be $\omega_{out}$, $\omega_{out} > \omega_{in}$ is satisfied.

[13] The image generating device according to [12], wherein the deflecting unit includes:

a first deflecting unit that defects light that has entered the light guide panel so that the light that has entered the light guide panel is totally reflected inside the light guide panel; and a second deflecting unit that deflects, more than once, the light propagated inside the light guide panel by total reflection so that the light propagated inside the light guide panel by total reflection is emitted from the light guide panel.

[14] <Transmissive spatial light modulating device>

A transmissive spatial light modulating device formed with pixels arranged in a two-dimensional matrix, the transmissive spatial light modulating device including on a light emitting side thereof, a microlens array including a microlens corresponding to each pixel, wherein when an incident solid angle of light that is emitted from a light source and enters a pixel is assumed to be $\omega_{in}$, and an emitting solid angle of light that passes through the pixel and is emitted from the microlens corresponding to the pixel is assumed to be $\omega_{out}$, $\omega_{out} > \omega_{in}$ is satisfied.

REFERENCE SIGNS LIST

10 Frame
10' Nose pad
11 Front unit
12 Hinge
13 Temple unit
14 End cover
15 Wire (signal wire or power wire)
16 Headphone unit
16' Wire for headphone unit
17 Imaging device
18 Control device (control circuit)
19 Attachment member
20 Viewer
21 Eye
30, 40 Joining member
100, 200, 300 Image display apparatus
111, 111A, 111B Image generating device
112 Parallel light emitting optical system (collimator optical system)
113 Housing
120, 220, 320 Light guiding unit
121, 221 Light guide panel
122, 222 First surface of light guide panel
123, 223 Second surface of light guide panel
321 Member
124, 125 Part of light guide panel
130 First deflecting unit
140 Second deflecting unit
230 First deflecting unit (first diffraction grating member)
240 Second deflecting unit (second diffraction grating member)
150 Transmissive spatial light modulating device
151 Light pipe
152 Pixel
160 Light source
170 Microlens array
171 Microlens
172 Second microlens array
173 Second microlens
174 Light diffuser panel

The invention claimed is:

1. An image display apparatus comprising:
   (A) an image generating device including a light source and a transmissive spatial light modulating device formed with pixels arranged in a two-dimensional matrix; and
   (B) a light guiding unit that guides light from the image generating device and emits the light toward an eye of a viewer,
   wherein
   the transmissive spatial light modulating device includes, on a light emitting side thereof, a microlens array including a microlens corresponding to each pixel, and
   when an incident solid angle of light entering a pixel from the light source is assumed to be $\omega_{in}$, and an emitting solid angle of light that passes through the pixel and is emitted from the microlens corresponding to the pixel is assumed to be $\omega_{out}$, $\omega_{out} > \omega_{in}$ is satisfied;
   wherein when a point at which light emitted from center of the image generating device enters the light guiding unit is assumed to be a point O, a normal in a portion of the light guiding unit passing through the point O is assumed to be an X-axis, an axis line of the light guiding unit in the portion of the light guiding unit passing through the point O is assumed to be a Y-axis, an optical axis of the light that is emitted from the center of the image generating device and enters the light guiding unit at the point O is assumed to be a ζ-axis, and a virtual plane including the ζ-axis and the Y-axis is assumed to be a ζ-Y plane, light that is emitted from the image generating device and enters the light guiding unit at a point $(0, Y_1, Z_1)$ forms an angle $\theta_Z$ with the ζ-Y plane and forms an angle $\theta_Y$ with an X-Z plane, and
   in a case of $Z_1 \neq 0$, $\theta_Z \neq \theta_Y$ is satisfied,
   a value of $\theta_Y$ is constant, regardless of a value of $Y_1$, and, as an absolute value of $Z_1$ increases, an absolute value of $\theta_Z$ increases.

2. The image display apparatus according to claim 1, wherein
   the transmissive spatial light modulating device includes, on a light incident side thereof, a second microlens array including a second microlens corresponding to each pixel, and
   when an incident solid angle of light entering the second microlens from the light source is assumed to be $\omega_{in-2}$, and an emitting solid angle of light emitted from the second microlens is assumed to be $\omega_{out-2}$, $\omega_{out} > \omega_{in} = \omega_{out-2} > \omega_{in-2}$ is satisfied.

3. The image display apparatus according to claim 1, wherein the transmissive spatial light modulating device includes a light diffuser panel on the light incident side thereof.

4. The image display apparatus according to claim 1, wherein
   the image generating device further includes a light pipe, and
   light emitted from the light source enters the transmissive spatial light modulating device via the light pipe.

5. The image display apparatus according to claim 1, wherein, as the absolute value of $Z_1$ increases, the absolute value of $\theta_Z$ increases monotonically or increases stepwise.

6. The image display apparatus according to claim 1, wherein an amount of deviation of an optical axis of a pixel from an optical axis of the microlens corresponding to the pixel is defined based on a value of $(0, Y_1, Z_1)$.

7. The image display apparatus according to claim 1, wherein the microlens array is formed with a cylindrical lens array or an anamorphic lens array.

8. The image display apparatus according to claim 1, wherein the light guiding unit includes:
   (B-1) a light guide panel that propagates incident light therein by total reflection and then emits the light;
   (B-2) a first deflecting unit that deflects light that has entered the light guide panel so that the light that has entered the light guide panel is totally reflected inside the light guide panel; and
   (B-3) a second deflecting unit that deflects, more than once, the light propagated inside the light guide panel by total reflection so that the light propagated inside the light guide panel by total reflection is emitted from the light guide panel.

9. The image display apparatus according to claim 1, wherein the transmissive spatial light modulating device is formed with a transmissive liquid crystal display device.

* * * * *